US00RE37598E

(19) United States
(12) Reissued Patent
Toukura et al.

(10) Patent Number: US RE37,598 E
(45) Date of Reissued Patent: Mar. 19, 2002

(54) CONTINUOUSLY VARIABLE TRANSMISSION CONTROL APPARATUS

(75) Inventors: Nobusuke Toukura, Yokosuka; Shojiro Sato, Yokohama; Takayoshi Nabeta, Yokosuka; Tadayuki Akiyama, Fuji, all of (JP)

(73) Assignee: Nissan Motor Co., Ltd., Yokohama (JP)

(21) Appl. No.: 09/517,704

(22) Filed: Mar. 2, 2000

Related U.S. Patent Documents

Reissue of:
(64) Patent No.: 5,722,500
Issued: Mar. 3, 1998
Appl. No.: 09/727,086
Filed: Oct. 8, 1996

(30) Foreign Application Priority Data

Oct. 12, 1995 (JP) ..... 7-264087
Oct. 12, 1995 (JP) ..... 7-264088
Oct. 16, 1995 (JP) ..... 7-267295

(51) Int. Cl.[7] ..... F16H 59/48
(52) U.S. Cl. ..... 477/40; 477/47
(58) Field of Search ..... 477/40, 47

(56) References Cited

U.S. PATENT DOCUMENTS 4,641,553 A * 2/1987 Kobayashi ..... 477/47
4,665,775 A * 5/1987 Nagamatsu et al. ..... 477/47
4,784,021 A * 11/1988 Morimoto ..... 477/47
4,862,771 A * 9/1989 Kumura et al. ..... 477/47
4,947,953 A * 8/1990 Morimoto ..... 477/47

FOREIGN PATENT DOCUMENTS

JP 6-81932 3/1994

* cited by examiner

*Primary Examiner*—Dirk Wright
(74) *Attorney, Agent, or Firm*—Foley & Lardner

(57) ABSTRACT

An apparatus for controlling a continuously variable transmission for use with an automotive vehicle. The transmission is operable at a variable speed ratio for transmitting a drive from its input shaft to its output shaft. A target value for the speed of rotation of the input shaft of the transmission is calculated based on the sensed vehicle operating conditions including vehicle acceleration. A correction factor per predetermined unit time is calculated based on the sensed vehicle acceleration when the sensed vehicle acceleration exceeds a threshold value with the accelerator pedal released. The correction factor is added to the target input shaft speed value to correct the target input shaft speed value in an increasing direction at intervals of the predetermined unit time. The threshold value is decreased as the vehicle speed increases. The speed ratio is controlled to bring the input shaft speed into coincidence with the corrected target value.

18 Claims, 18 Drawing Sheets

RTO=
Ni/No

DSRENBR

No
60

VSP
40
0
ON

BRK
OFF
DECELERATION

-G
0
ACCELERATION
t1
t2
TIME t

CONTINUOUSLY VARIABLE TRANSMISSION CONTROL APPARATUS

Matter enclosed in heavy brackets [ ] appears in the original patent but forms no part of this reissue specification; matter printed in italics indicates the additions made by reissue.

BACKGROUND OF THE INVENTION

This invention relates to an apparatus for controlling a continuously variable transmission for use with an automotive vehicle to change the engine brake force when the vehicle is coasting.

Some automotive vehicles employ a continuously variable transmission having an input shaft coupled to the engine and an output shaft coupled to the drive shaft for transmitting a drive from the engine to the drive shaft. Such a continuously variable transmission operates with a speed ratio controlled in a manner to bring the speed of rotation of the input shaft into coincidence with a target value calculated as a function of engine throttle position (or accelerator pedal position) and vehicle speed. It is the current practice to decrease the target input shaft speed value as the throttle position decreases. If the vehicle is coasting on a downhill slope, the operator will release the accelerator pedal. This causes the throttle position to decrease so that the target input shaft speed value is changed (decreased) in a direction to weaken the engine brake. As a result, the operator would feel an excessive degree of vehicle acceleration in spite of the fact that the accelerator pedal is released and increase the frequency at which the operator depresses the brake pedal.

For example, Japanese Patent Kokai No. 6-81932 discloses a continuously variable transmission control apparatus intended to reduce the frequency at which the operator depresses the brake pedal when the vehicle is coasting on a downhill slope by increasing the lower limit for the target input shaft speed value as the absolute value of the vehicle weight gradient resistance increases to perform aggressive operate engine brake operations. With such a conventional apparatus, however, the target input shaft speed value changes frequently to provide a sense of incompatibility to the operator with changes in the gradient of the slope.

SUMMARY OF THE INVENTION

It is a main object of the invention to provide an improved continuously variable transmission control which can provide a smooth engine brake force change to meet the operator's expectation therefor when the vehicle is coasting with the accelerator pedal being released.

There is provided, in accordance with the invention, an apparatus for controlling a continuously variable transmission for use with an automotive vehicle including an accelerator pedal. The transmission has an input and output shaft. The transmission is operable at a variable speed ratio for transmitting a drive from the input shaft to the output shaft. The continuously variable transmission control apparatus comprises means for sensing vehicle operating conditions including vehicle acceleration and vehicle speed, means for producing a released accelerator pedal indicative signal when the accelerator pedal is released, means for calculating a target value for the speed of rotation of the input shaft based on the sensed vehicle operating conditions, means for calculating a correction factor per predetermined unit time based on the sensed vehicle acceleration when the sensed vehicle acceleration exceeds a threshold value in the presence of the released accelerator pedal indicative signal, means for adding the correction factor to the target input shaft speed value to correct the target input shaft speed value in an increasing direction at intervals of the predetermined unit time, means for decreasing the threshold value as the vehicle speed increases, and means for controlling the speed ratio to bring the input shaft speed into coincidence with the corrected target value.

In another aspect of the invention, the continuously variable transmission control apparatus comprises means for sensing vehicle operating conditions including vehicle acceleration and vehicle speed, means for producing a released accelerator pedal indicative signal when the accelerator pedal is released, means for calculating a target value for the speed of rotation of the input shaft based on the sensed vehicle operating conditions, means for calculating a correction factor per predetermined unit time based on the sensed vehicle acceleration when the sensed vehicle acceleration is less than a threshold value in the presence of the released accelerator pedal indicative signal, means for subtracting the correction factor from the target input shaft speed value to correct the target input shaft speed value in a decreasing direction at intervals of the predetermined unit time, means for decreasing the threshold value as the vehicle speed increases, and means for controlling the speed ratio to bring the input shaft speed into coincidence with the corrected target value.

In another aspect of the invention, the continuously variable transmission control apparatus comprises means for sensing vehicle operating conditions including vehicle acceleration, means for producing a released accelerator pedal indicative signal when the accelerator pedal is released, means for producing a brake application indicative signal in response to application of braking to the vehicle, means for calculating a target value for the speed of rotation of the input shaft based on the sensed vehicle operating conditions, means for calculating a correction factor per predetermined unit time based on the sensed vehicle acceleration to bring the vehicle acceleration into a predetermined range in the presence of the released accelerator pedal indicative signal, means for adding the correction factor to the target input shaft speed value to correct the target input shaft speed value at intervals of the predetermined unit time, means for controlling the speed ratio to bring the input shaft speed into coincidence with the corrected target value, and means for retaining the correction factor in the presence of the brake application indicative signal.

In another aspect of the invention, the continuously variable transmission control apparatus comprises means for sensing vehicle operating conditions including vehicle acceleration, means for sensing an operator's demand for vehicle cruising, means for sensing an operator's demand for vehicle acceleration, means for calculating a target value for the speed of rotation of the input shaft based on the sensed vehicle operating conditions, means responsive to the sensed operator's demand for vehicle cruising for correcting the calculated target input shaft speed value to bring the vehicle acceleration into a predetermined range, means responsive to the operator's demand for vehicle acceleration sensed during the target input shaft speed value correction for changing the target input shaft speed value at a predetermined rate toward the calculated target value, and means for controlling the speed ratio to bring the input shaft speed into coincidence with the corrected target value.

In still another aspect of the invention, the continuously variable transmission control apparatus comprises means for sensing vehicle operating conditions including vehicle acceleration, means for sensing a degree to which the accelerator pedal is depressed, means for calculating a target value for the speed of rotation of the input shaft based on the sensed vehicle operating conditions, means for correcting the calculated target input shaft speed value to bring the vehicle acceleration into a predetermined range when the sensed degree indicates the accelerator pedal released, means for changing the target input shaft speed value at a predetermined rate toward the calculated target value when the sensed degree indicate the accelerator pedal depressed during the target input shaft speed value correction, and means for controlling the speed ratio to bring the input shaft speed into coincidence with the corrected target value.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
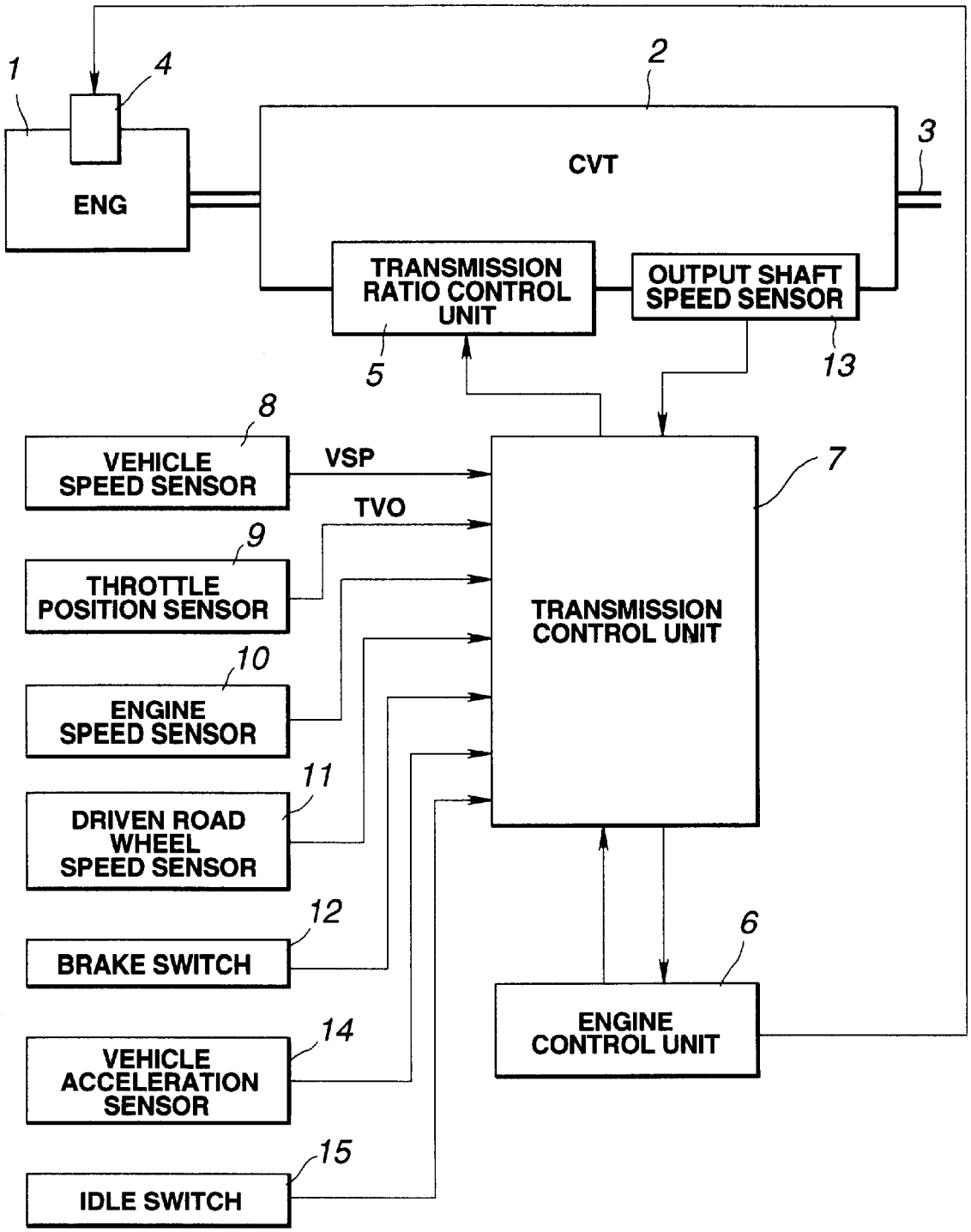
FIG. 1 is a block diagram showing one embodiment of a continuously variable transmission control apparatus made in accordance with the invention.

With reference to the drawings, and in particular to FIG. 1, there is shown a continuously variable transmission control apparatus for use with an automotive vehicle having an internal combustion engine 1. The engine 1 operates on command from an engine control unit 6 which controls the amount of fuel metered to the engine 1, the fuel-injection timing and the ignition-system spark-timing. For example, the amount of fuel metered to the engine, this being determined by the width of the electrical pulses applied to the fuel injector 4, is repetitively determined from calculations performed in the engine control unit 6 based on various conditions of the engine that are sensed during its operation. These sensed conditions include cylinder-head coolant temperature, ambient temperature, throttle position, engine load, engine speed, etc. The calculated value for the fuel-injection pulse-width is transferred to set the fuel injector 4 according to the calculated value therefor. A drive from the engine 1 is transmitted to a drive shaft 3 through a continuously variable transmission 2. The continuously variable transmission 2 has an input shaft coupled to an internal combustion engine 1 and an output shaft coupled to the drive shaft 3. The continuously variable transmission 2 may be of the V-belt or troidal type.

The continuously variable transmission 2 operates on command applied to a speed ratio control unit 5 from a transmission control unit 7. The transmission control unit 7 determines a target input shaft speed DSRREV repetitively from calculations performed therein based on various conditions of the automotive vehicle that are sensed during its operation. These sensed conditions include vehicle speed VSP, throttle position TVO, transmission input shaft speed Ni, driven road wheel speed, brake pedal position, transmission output shaft speed No, vehicle longitudinal acceleration G and accelerator pedal position. Thus, a vehicle speed sensor 8, a throttle position sensor 9, an engine speed sensor 10, a driven road wheel speed sensor 11, a brake switch 12, a transmission output shaft speed sensor 13, a vehicle acceleration sensor 14 and an idle switch 15 are connected to the transmission control unit 7. The vehicle speed sensor is provided to sense the speed VSP of traveling of the automotive vehicle. The throttle position sensor 9 may be a potentiometer associated with the throttle valve situated in the induction passage of the engine and connected in a voltage divider circuit for supplying a voltage proportional to the degree TVO of opening of the throttle valve. The engine speed sensor 10 is provided for producing a pulse signal having a repetition rate proportional to the speed Ne of rotation of the engine. The driven road wheel speed sensor 11 is located for producing a pulse signal having a repetition rate proportional to the speed of rotation of the driven road wheels. The brake switch 12 is responsive to the application of braking to the automotive vehicle to close to supply current from the engine battery to the transmission control unit 7. The transmission output shaft speed sensor 13 is located for producing a pulse signal of a repetition rate proportional to the speed of rotation of the transmission output shaft. The vehicle acceleration sensor 14 is provided for producing a signal indicative of the longitudinal acceleration G of the automotive vehicle. The idle switch 15 closes to supply current from the engine battery to the transmission control unit 7 when the throttle position is at an angle less than a predetermined value, that is, the accelerator pedal is released. The continuously variable transmission is shown as having an input shaft directly coupled to the engine 1. In this case, the speed Ni of rotation of the transmission input shaft is equal to the engine speed Ne. It is to be understood, of course, that the transmission input shaft may be coupled to the engine 1 through a reduction gear unit or torque converter. In this case, another speed sensor is provided to produce a signal indicative of the speed Ni of rotation of the transmission input shaft. The transmission control unit 7 also communicates with the engine control unit 6 for synchronized engine and transmission control. The transmission control unit 7. The determined target input shaft speed DSRREV is converted into a corresponding target speed ratio DSRRTO (=Ni/No) which is transferred to the speed ratio control unit 5 to bring the input shaft speed Ni into coincidence with the target input shaft speed DSRREV.

The transmission control unit 7 may employ a digital computer which includes a central processing unit (CPU) a central processing unit (CPU), a read only memory (ROM), a random access memory (RAM) and an input/output interface unit (I/O). The central processing unit communicates with the rest of the computer. The input/output interface unit includes an analog-to-digital converter which receives analog signals from the throttle position sensor 9 and other sensors and converts them into digital form for application to the central processing unit. The input/output interface unit also includes counters which count the pulses fed thereto from the speed sensors 10, 11 and 13 and convert the counts into corresponding speed indication digital signals for application to the central processing unit. The read only memory contains the programs for operating the central processing unit and further contains appropriate data in look-up tables used in calculating appropriate values for the speed ratio control.

Figure 2:
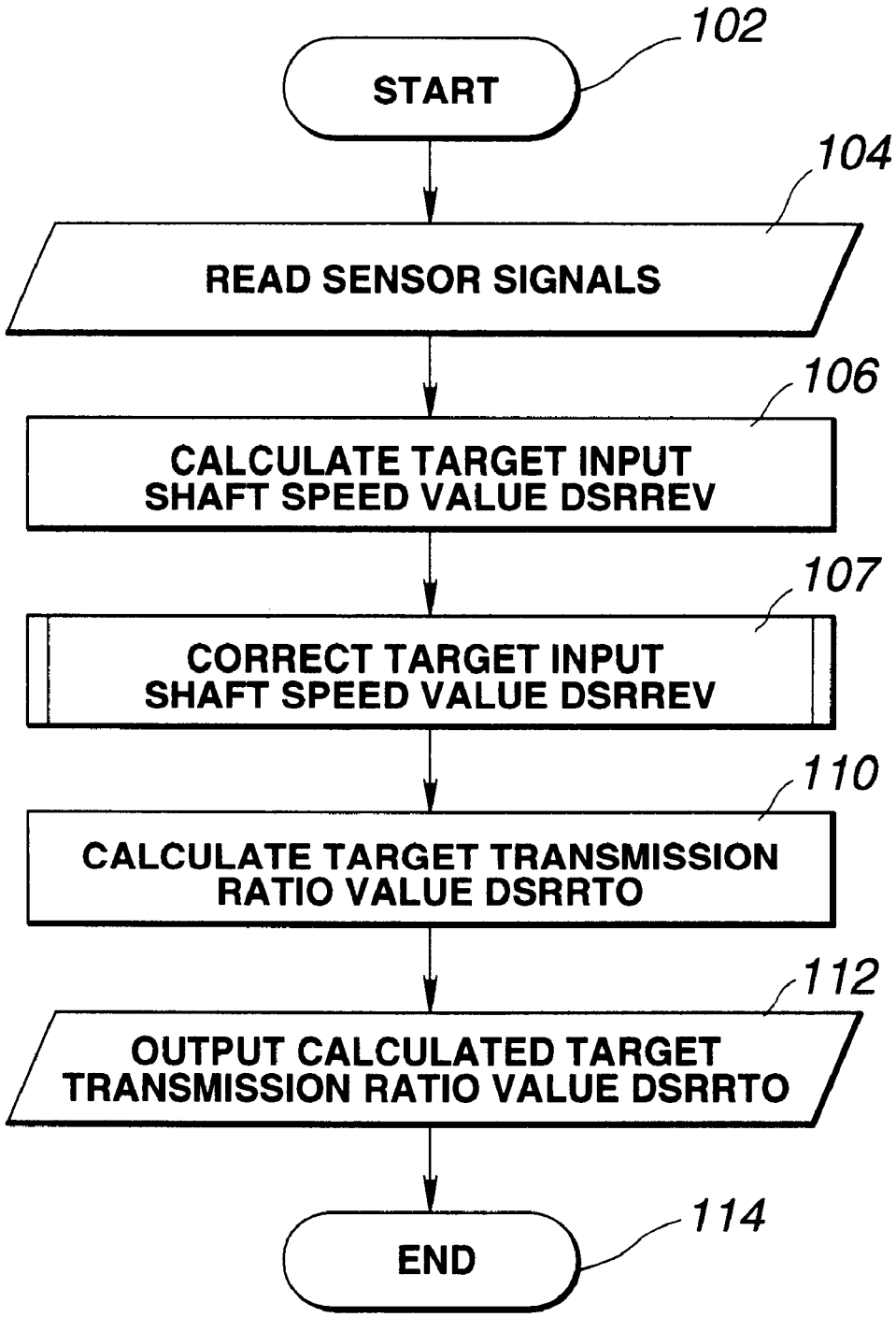
FIG. 2 is an overall flow diagram showing the operation of the digital computer used for the continuously variable transmission control.
Figure 11:
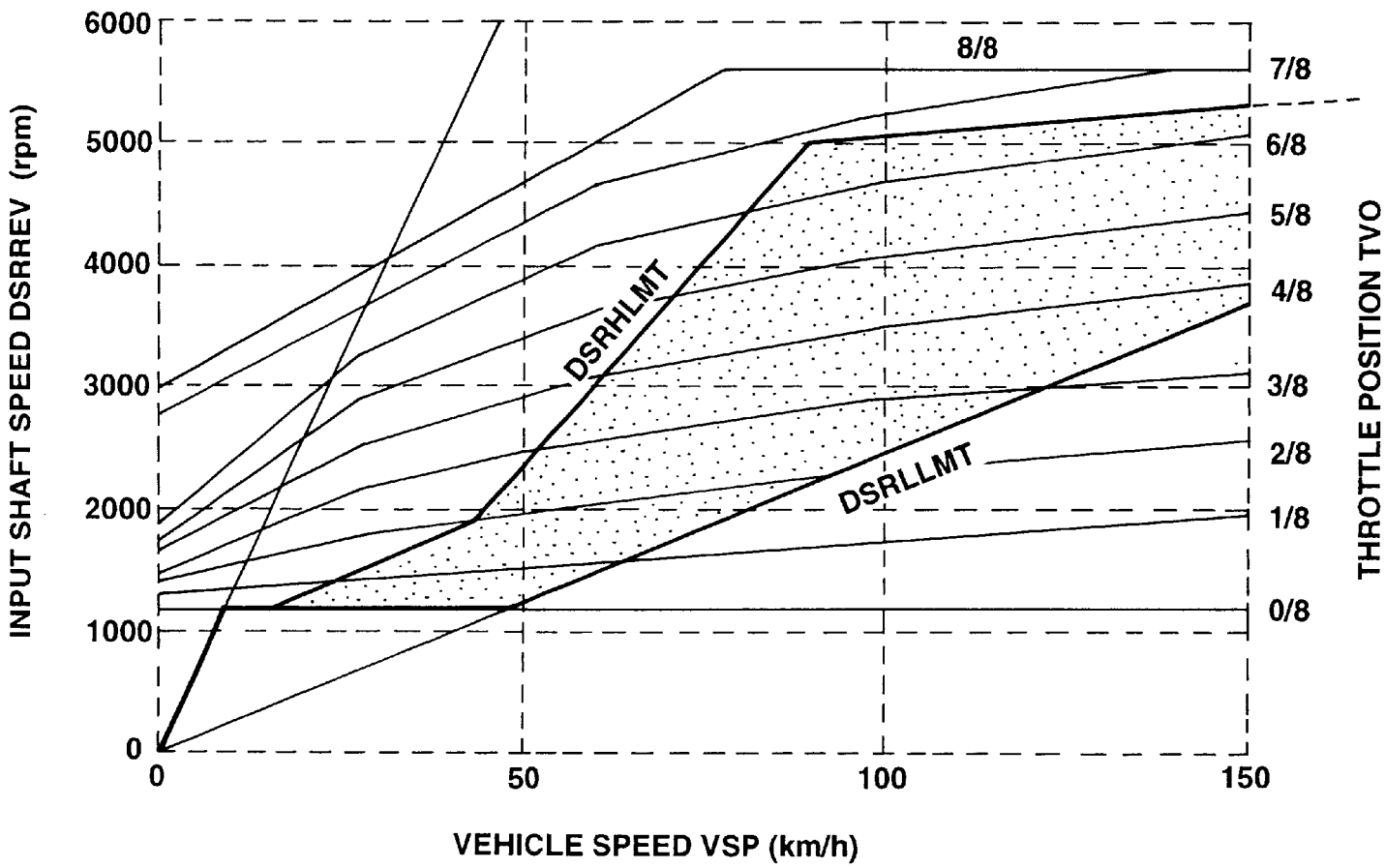
FIG. 11 is a graph of vehicle speed versus input shaft speed.

FIG. 2 is a flow diagram illustrating the programming of the digital computer as it is used to control the continuously variable transmission 2. The computer program is entered at the point 102 at uniform intervals of time, for example 5 msec. At the point 104 in the program, the sensor signals fed to the transmission control unit 7 from various sensors 8 to 15 are read into the computer memory. At the point 106, a target value DSRREV for the speed Ni of rotation of the transmission input shaft is calculated from a speed change map programmed into the computer. The speed change map defines the target input shaft speed DSRREV as a function of throttle position TVO and vehicle speed VSP, as shown in FIG. 11. At the point 108, the calculated target input shaft speed value DSRREV is corrected for engine brake operation. This correction is made based on the vehicle longitudinal acceleration G as described later in greater detail. At the point 110 in the program, a target speed ratio DSRRTO is calculated to bring the transmission input shaft speed Ni in coincidence with the corrected target value DSRREV. At the point 112, the calculated target speed ratio value DSRRTO is transferred to the input/output interface unit which converts it into a corresponding control signal. This control signal is applied to the speed ratio control unit 5 which thereby operates the transmission 2 with a speed ratio corresponding to the calculated value DSRRTO.

Figure 3:
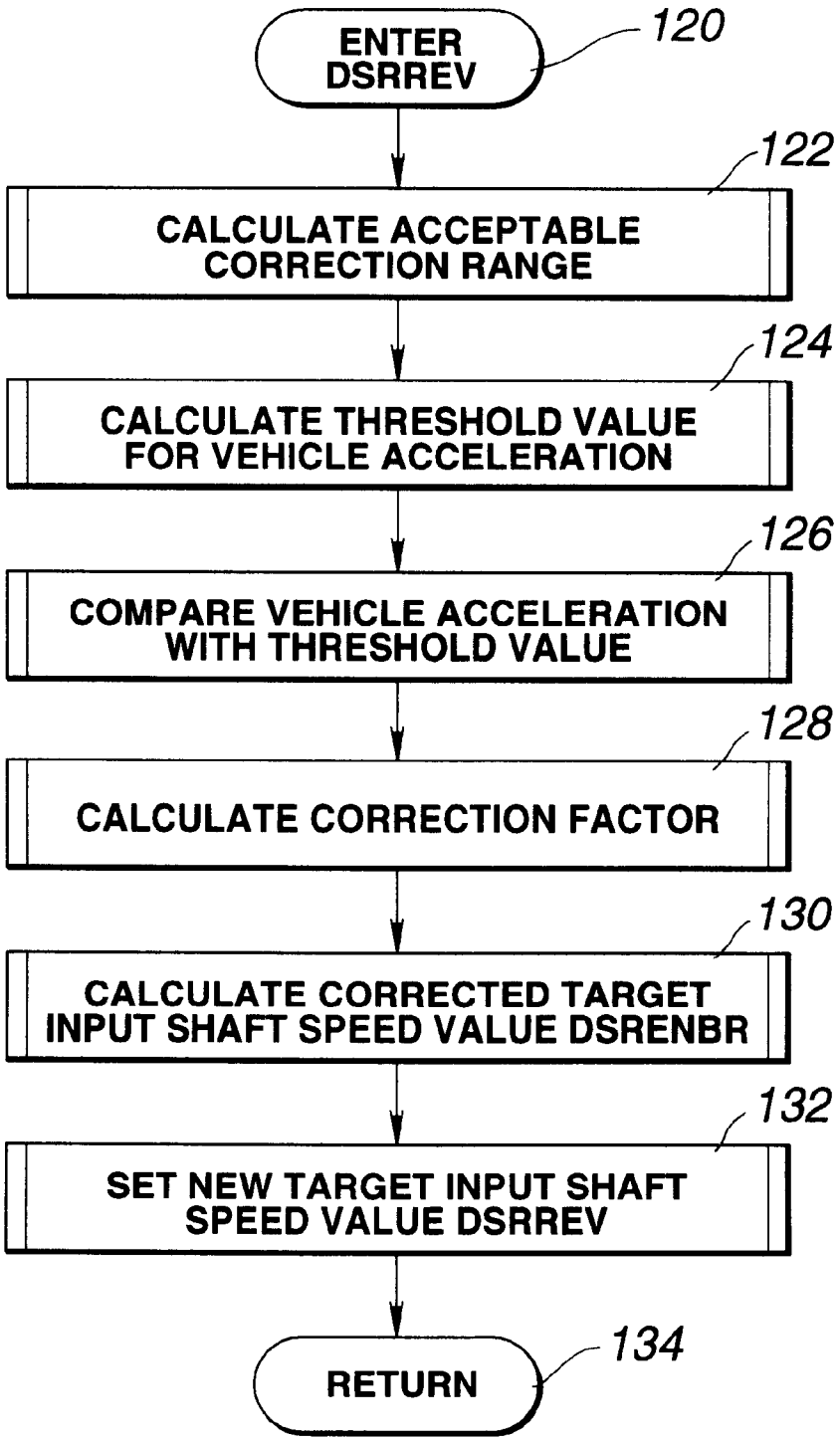
FIG. 3 is a detailed flow diagram showing the programming of the digital computer as it is used for target input shaft speed calculation.

FIG. 3 is a flow diagram illustrating the above correction of the target transmission input shaft speed value DSRREV. At the point 120 in FIG. 3, which corresponds to the point 108 of FIG. 2, the computer program is entered. At the point 122, an acceptable correction range where the speed Ni of the input shaft of the continuously variable transmission 2 can be corrected is determined based on the target input shaft speed DSRREV calculated at the point 106 of FIG. 2. At the point 124, a threshold value of the vehicle longitudinal acceleration G is calculated. At the point 126, the vehicle acceleration G is compared with the calculated threshold value for a determination as to whether or not a stronger or weaker engine brake is required. At the point 128, the rate of change of the engine brake force, that is, a correction factor by which the target input shaft speed is to be corrected per unit time, is calculated according to the vehicle longitudinal acceleration G. At the point 130, the correction factor calculated at the point 128 is used to correct the target input shaft speed DSRREV so as to produce an engine brake force corresponding to the vehicle longitudinal acceleration. At the point 132, the corrected target input shaft speed DSRENBR is set as a new target input shaft speed DSRREV. The new target input shaft speed DSRREV is outputted to calculate a target speed ratio DSRRTO. Following this, the program proceeds to the point 134 where the program returns to the entry point 120.

Figure 12:
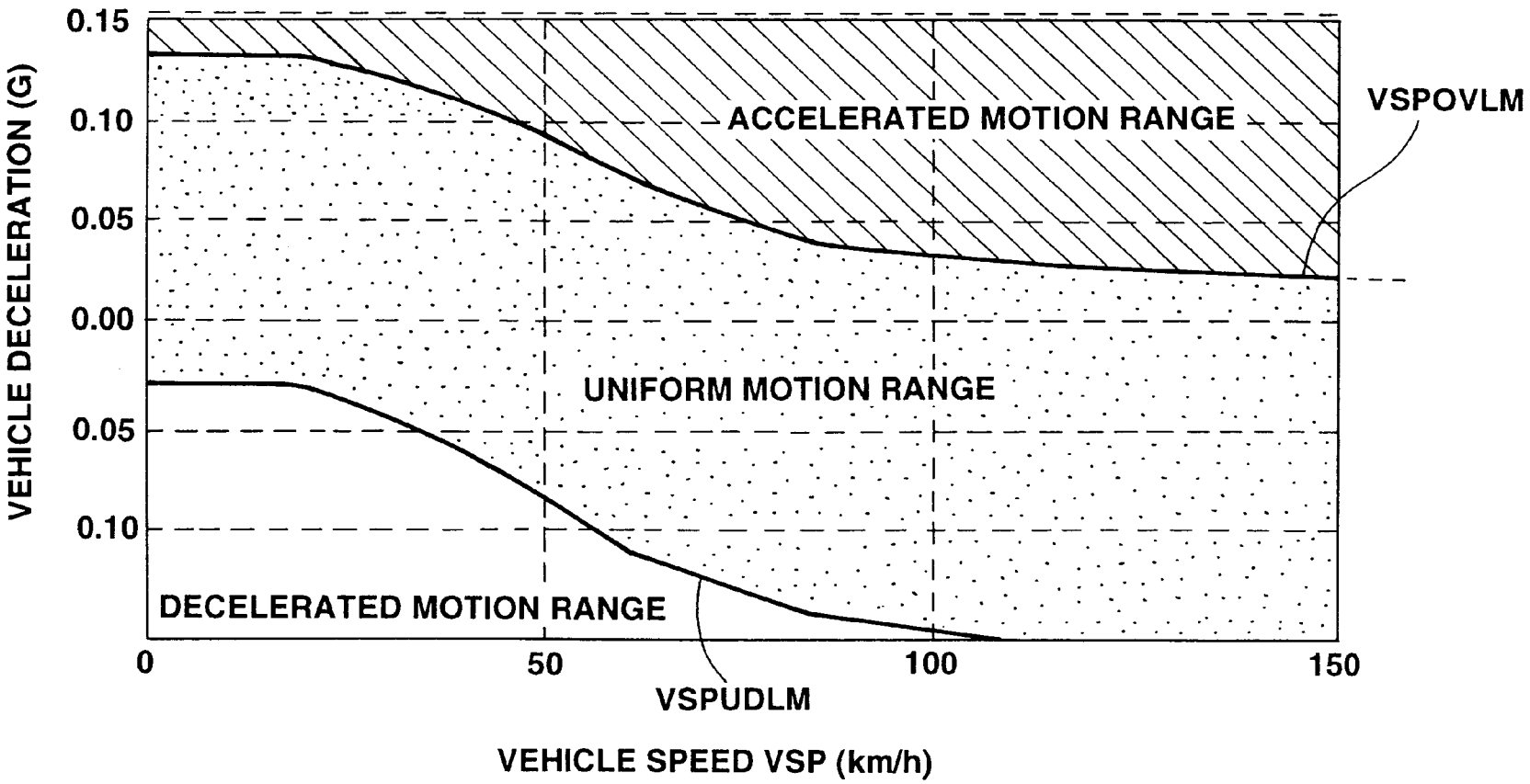
FIG. 12 is a graph of vehicle speed versus vehicle acceleration.

Referring to FIGS. 4 to 10, the details of the above correction of the target transmission input shaft speed value DSRREV will be described. At the point 140 in FIG. 4, which corresponds to the point 122 of FIG. 3, the computer program is entered. At the point 142 in the program, an upper limit DSRHLMT of the acceptable correction range for the input shaft speed Ni is calculated from the map of FIG. 11 which defines the upper limit DSRHLMT as a function of vehicle speed VSP. At the point 144, a lower limit DSRLLMT of the acceptable correction range for the input shaft speed Ni is calculated from the map of FIG. 11 which defines the lower limit DSRLLMT as a function of vehicle speed VSP. At the point 146, an acceleration side threshold value VSPOVLM is calculated from a map programmed into the computer. This map defines the acceleration side threshold value VSPOVIM as a function of vehicle speed VSP, as shown in FIG. 12. At the point 148, a deceleration side threshold value VSPUDLM is calculated from the map of FIG. 12. The map may be obtained experimentally from accelerations the operator expects when the accelerator pedal is released, this being detected when the idle switch 15 is turned on. The operator bodily senses vehicle acceleration in an accelerated motion range (AMR) defined above the acceleration side threshold value VSPOVLM and vehicle deceleration in a decelerated motion range (DMR) defined below the deceleration side threshold value VSPUDLM.

Figure 4:
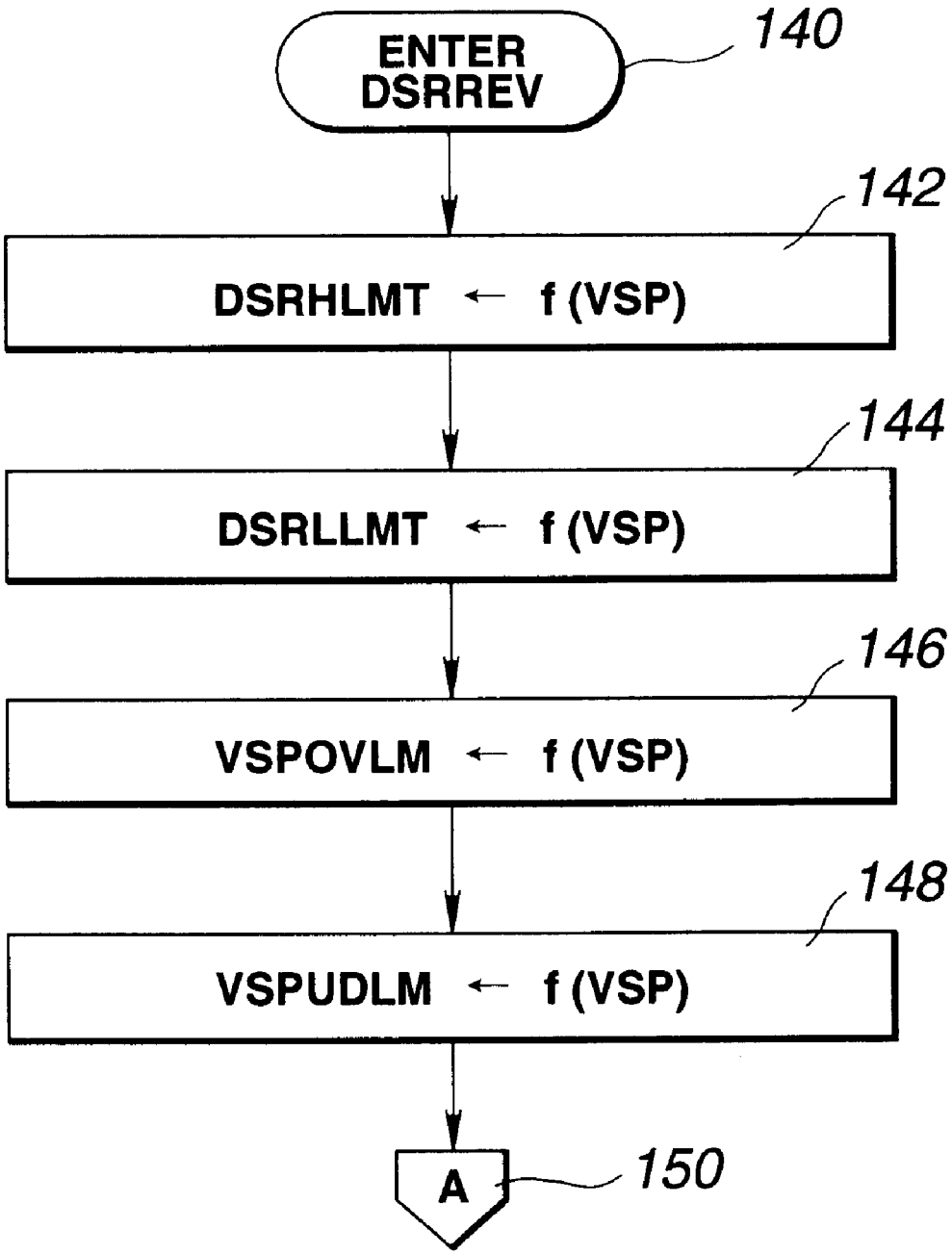
FIGS. 4 to 10 are detailed flow diagrams showing the programming of the digital computer as it is used for target input shaft speed calculation.
Figure 5:
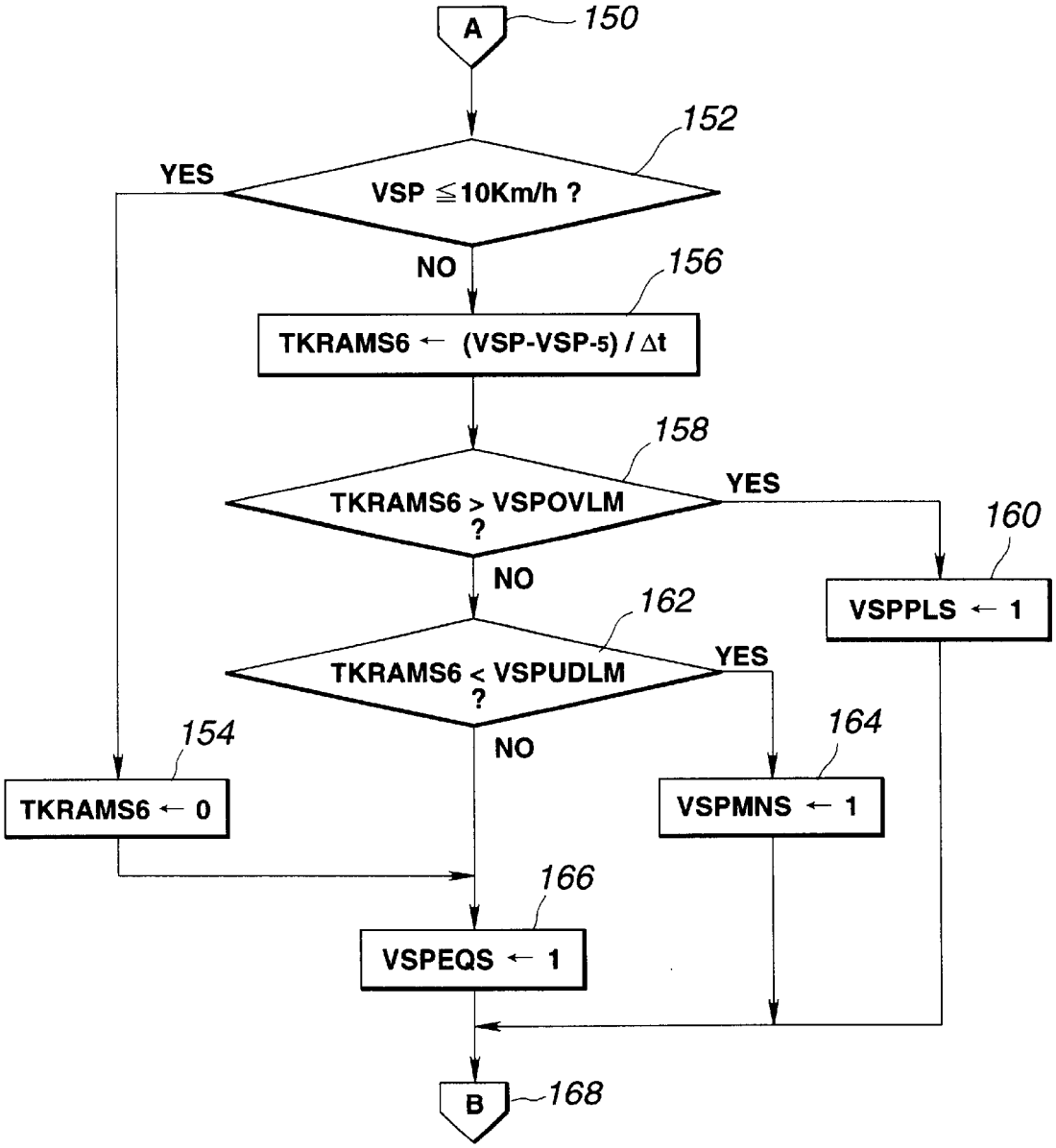

Upon completion of the step at the point 148 in the program of FIG. 4, the program proceeds to the point 150 of FIG. 5 which corresponds to the point 126 of FIG. 3. At the point 152, a determination is made as to whether or not the vehicle speed VSP is equal to or less than a predetermined value, for example, 10 Km/h. If the answer to this question is "yes", then it means that the vehicle speed is in a predetermined low speed range and the program proceeds to the point 154 where the vehicle acceleration TKRAMS6 is set at 0 and then to the point 166. Otherwise, the program proceeds to the point 156 where the vehicle acceleration (or deceleration) TKRAMS6 is calculated based on the difference between the vehicle speed VSP read in this cycle of execution of this program and the vehicle speed $VSP_{-5}$ read before a predetermined number of (in this case 5) cycles of execution of this program. Although the vehicle acceleration TKRAMS6 is calculated as the rate of change of the vehicle speed VSP, it is to be understood, of course, that it may be the sensed value of the vehicle acceleration sensor 14. At the point 158, a determination is made as to whether or not the vehicle acceleration TKRAMS6 is greater than the acceleration side threshold value VSPOVLM calculated at the point 146 of FIG. 4. If the answer to this question is "yes", then the program proceeds to the point 16 where an accelerated motion flag VSPMNS is set to indicate that the vehicle acceleration is in the accelerated motion range so that a stronger engine brake is required and then to the point 168. Otherwise, the program proceeds to another determination step at the point 162. This determination is as to whether or not the vehicle acceleration TKRAMS6 is smaller than the deceleration side threshold value VSPUDLM calculated at the point 148 of FIG. 4. If the answer to this question is "yes", then the program proceeds to the point 164 where a decelerated motion flag VSPMNS is set to indicate that the vehicle acceleration is in the decelerated motion range requiring a weaker engine brake force and then to the point 168. Otherwise, the program proceeds to the point 166 where a uniform motion flag VSPEOS is set to indicate that the vehicle acceleration is in the uniform motion range so that the existing engine brake is to be retained.

Figure 6:
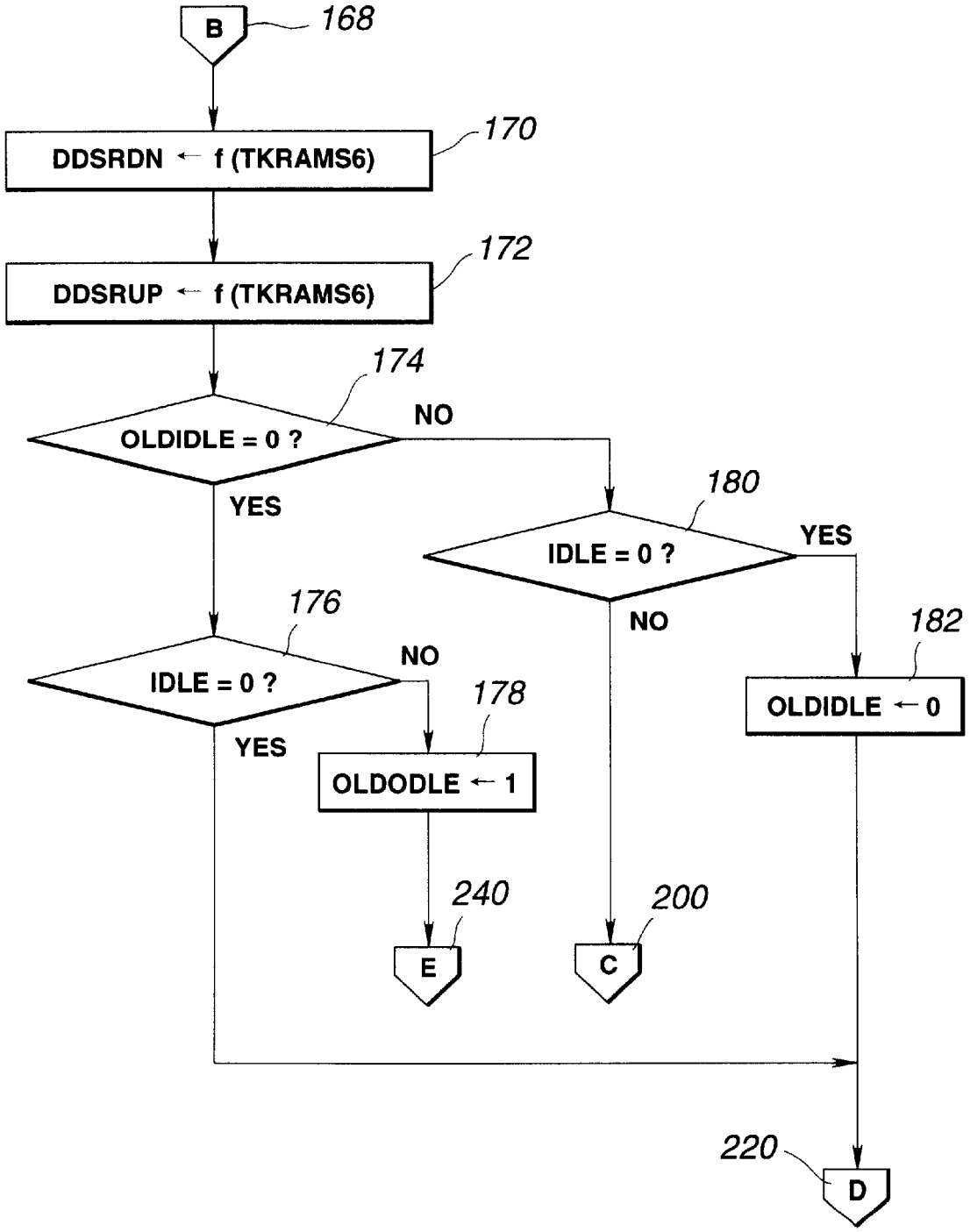
Figure 13:
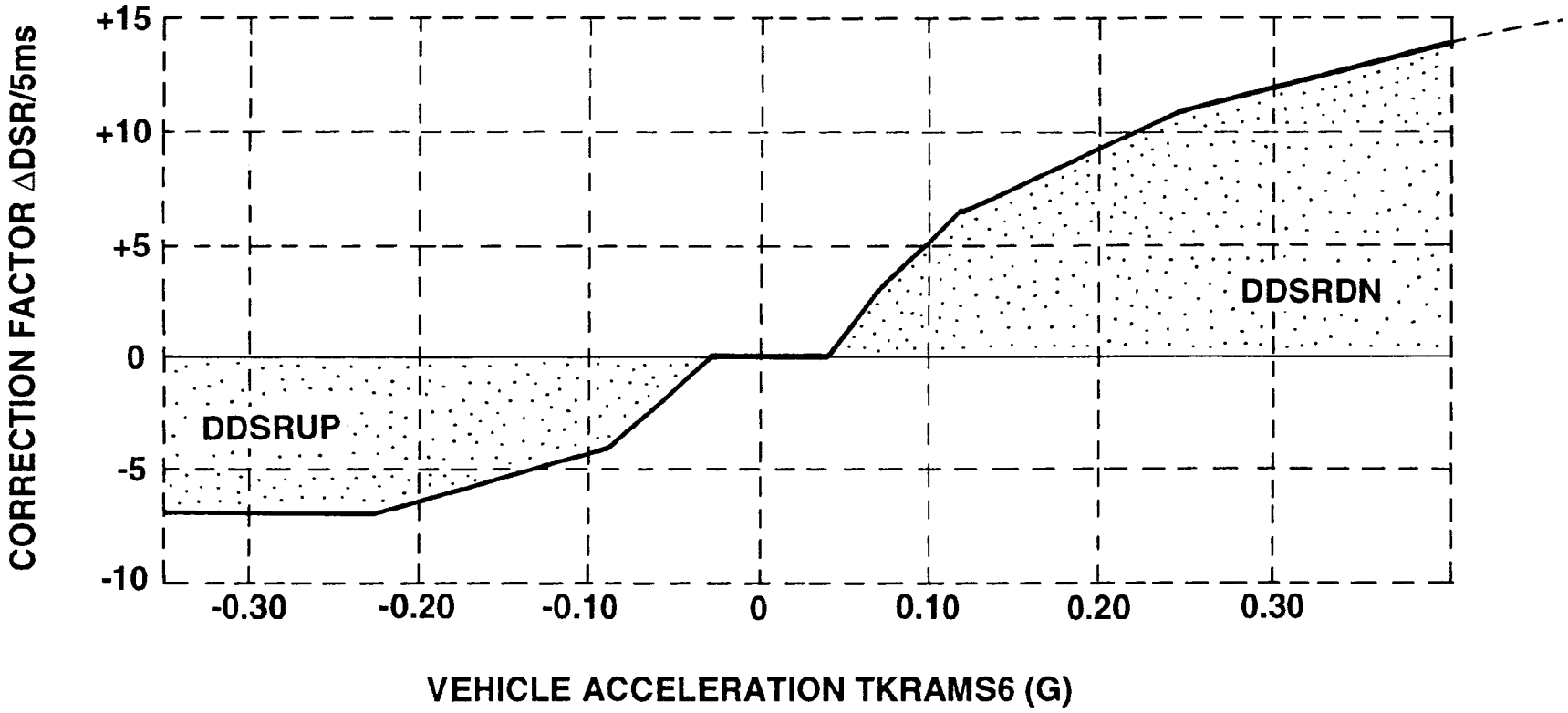
FIG. 13 is a graph of vehicle acceleration versus input shaft speed correction factor.

Following this, the program proceeds to the point 168 of FIG. 6 which corresponds to the point 128 of FIG. 3. At the points 170 and 172 in the program, a down- or up-shift correction factor DDSRDN or DDSRUP by which the target input shaft speed DSRREV is to be corrected per unit time is calculated from a map programmed into the computer. This map specifies this correction factor DDSRDN or DDSRUP as a function of vehicle acceleration TKRAMS6, as shown in FIG. 13. This map may be obtained experimentally, as described later. The downshift correction factor DDSRDN is calculated in a direction to increase the target input shaft speed value DSRREV so as to increase the engine brake force when the vehicle acceleration TKRAMS6 has a positive sign and the upshift correction factor DDSRUP is calculated in a direction to decrease the target input shaft speed value DSRREV so as to decrease the engine brake force when the vehicle acceleration TKRAMS6 has a negative sign. In the illustrated case, the unit time corresponds to the time interval (5 msec) of execution of this program.

At the point 174 in the program, a determination is made as to whether or not a flag OLDIDLR, which was set to 1 if the idle switch 15 is off in the last cycle of execution of this program, is 0. If the answer to this question is "yes", then the accelerator pedal was depressed and the program proceeds to another determination step at the point 176. This determination is as to whether or not a flag IDLE, which has been set to 1 if the idle switch 15 is off in the present cycle of execution of this program, is 0. If the answer to this question is "yes", then it means that the accelerator pedal remains depressed and the program proceeds to the point 220 of FIG. 8. Otherwise, it means that the accelerator pedal is released from its depressed position and the program proceeds to the point 178 where the flag OLDIDLE is set to 1 and then the program proceeds to the point 240 of FIG. 9.

If the answer to the question inputted at the point 174 is "no", then it means that the accelerator pedal was released and the program proceeds to another determination step at the point 180. This determination is as to whether or not the flag IDLE is 0. If the answer to this question is "no", then it means that the accelerator pedal remains released and the program proceeds to the point 200 of FIG. 7. Otherwise, it means that the accelerator pedal is depressed from its released position and the program proceeds to the point 182 where the flag OLDIDLE is cleared to 0 and then to the point 220 of FIG. 8.

Figure 7:
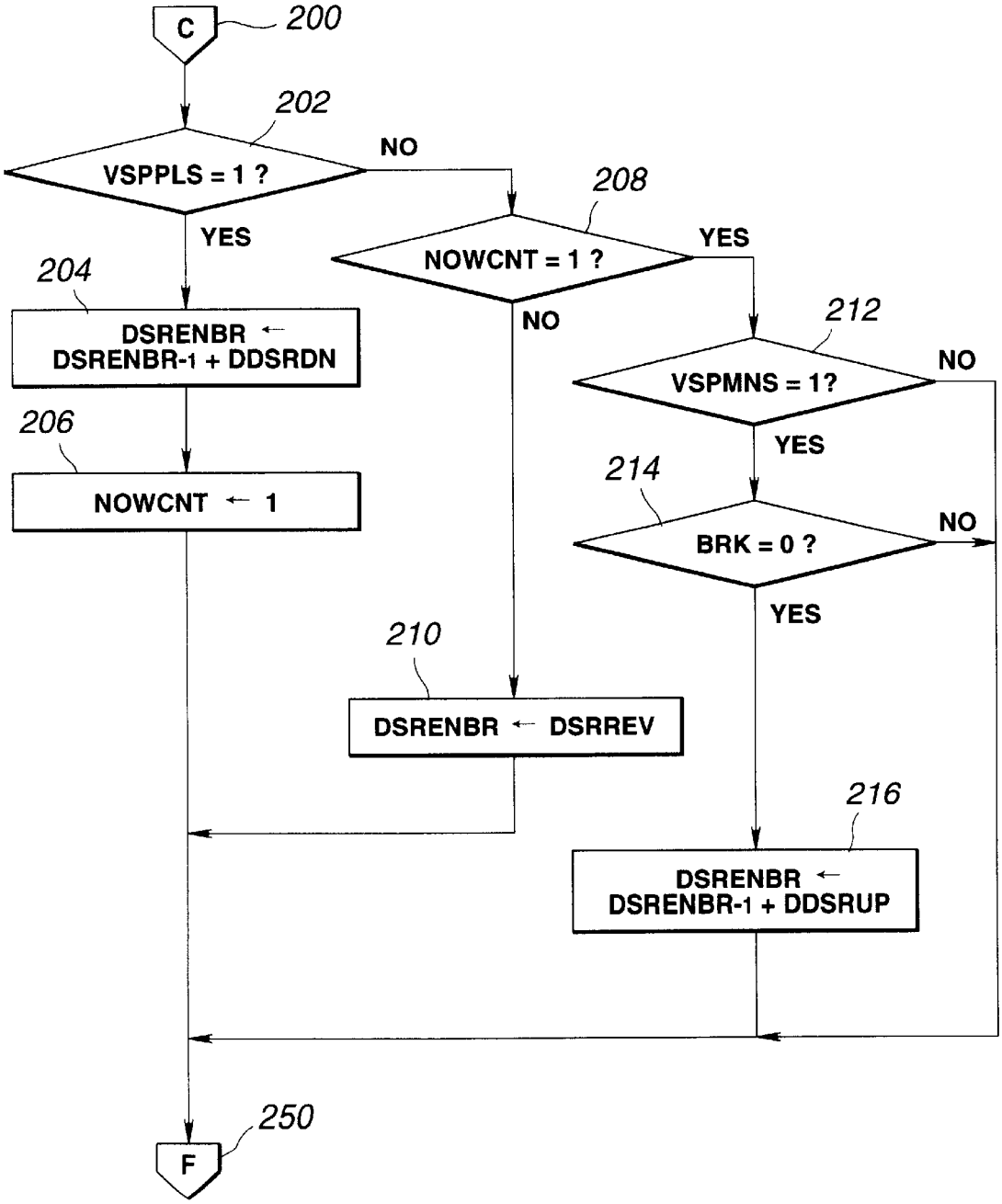

FIG. 7 is a flow diagram illustrating the correction of the target input shaft speed value DSRREV when the accelerator pedal remains released. At the point 202 in the program, a determination is made as to whether or not the accelerated motion flag VSPPLS (FIG. 5) has been set at 1. If the answer to this question is "yes", then it means that the vehicle acceleration is in the accelerated motion range (FIG. 12) and the program proceeds to the point 204 where the central processing unit increase the target input shaft speed value DSRREV by adding the downshift correction factor DDSRDN calculated at the point 170 of FIG. 6 to the last corrected target input shaft speed value DSRENBR (DSRENBR=DSRENBR$_{-1}$+DDSRDN where DSRENBR$_{-1}$ is the corrected target input shaft speed value obtained in the last cycle of execution of this program) in order to increase the engine brake force so as to bring the vehicle acceleration from the accelerated motion range into the uniform motion range. At the point 206, a correction flag NOWCNT is set at 1 to indicate that the target input shaft speed value DSRREV is being corrected. Following this, the program proceed to the point 250 of FIG. 10.

If the answer to the question inputted at the point 202 is "no", then the program proceeds to another determination step at the point 208. This determination is as to whether or not the correction flag NOWCNT has been set. If the answer to this question is "no", then it means that no correction is required for the target input shaft speed value DSRREV and the program proceeds to the point 210 where the target input shaft speed value DSRREV calculated at the point 106 of FIG. 2 is set for the corrected target input shaft speed value DSRENBR. Following this, the program proceeds to the point 250 of FIG. 10.

If the answer to the question inputted at the point 208 is "no", then the program proceeds to another determination step at the point 212. This determination is as to whether or not the decelerated motion flag VSPMNS (FIG. 5) has been set. If the answer to this question is "yes", then it means that the vehicle acceleration is in the decelerated motion range and the program proceeds to the point 214. Otherwise, the program proceeds to the point 250 of FIG. 10. At the point 214, a determination is made as to whether or not the brake pedal is released. This determination is made based on the signal BRK fed from the brake switch 12. If the answer to this question is "yes" (BRK=0), then the program proceeds to the point 216 where the central processing unit decreases the target input shaft speed value DSRREV gradually by adding the upshift correction factor DDSRUP (negative value) calculated at the point 172 of FIG. 6 to the last corrected target input shaft speed value DSRENBR (DSRENBR=DSRENBR$_{-1}$+DDSRUP where DSRENBR$_{-1}$ is the corrected target input shaft speed value DSRENBR obtained in the last cycle of execution of this program). Following this, the program proceeds to the point 250 of FIG. 10. If the answer to the question inputted at the point 214 is "no", then the program proceeds to the point 250 of FIG. 10. That is, the operator's braking operation is given top priority by preventing the target input shaft speed value DSRREV from being corrected to a smaller value even though the vehicle acceleration is in the decelerated motion range where the engine brake should be weakened.

Figure 8:
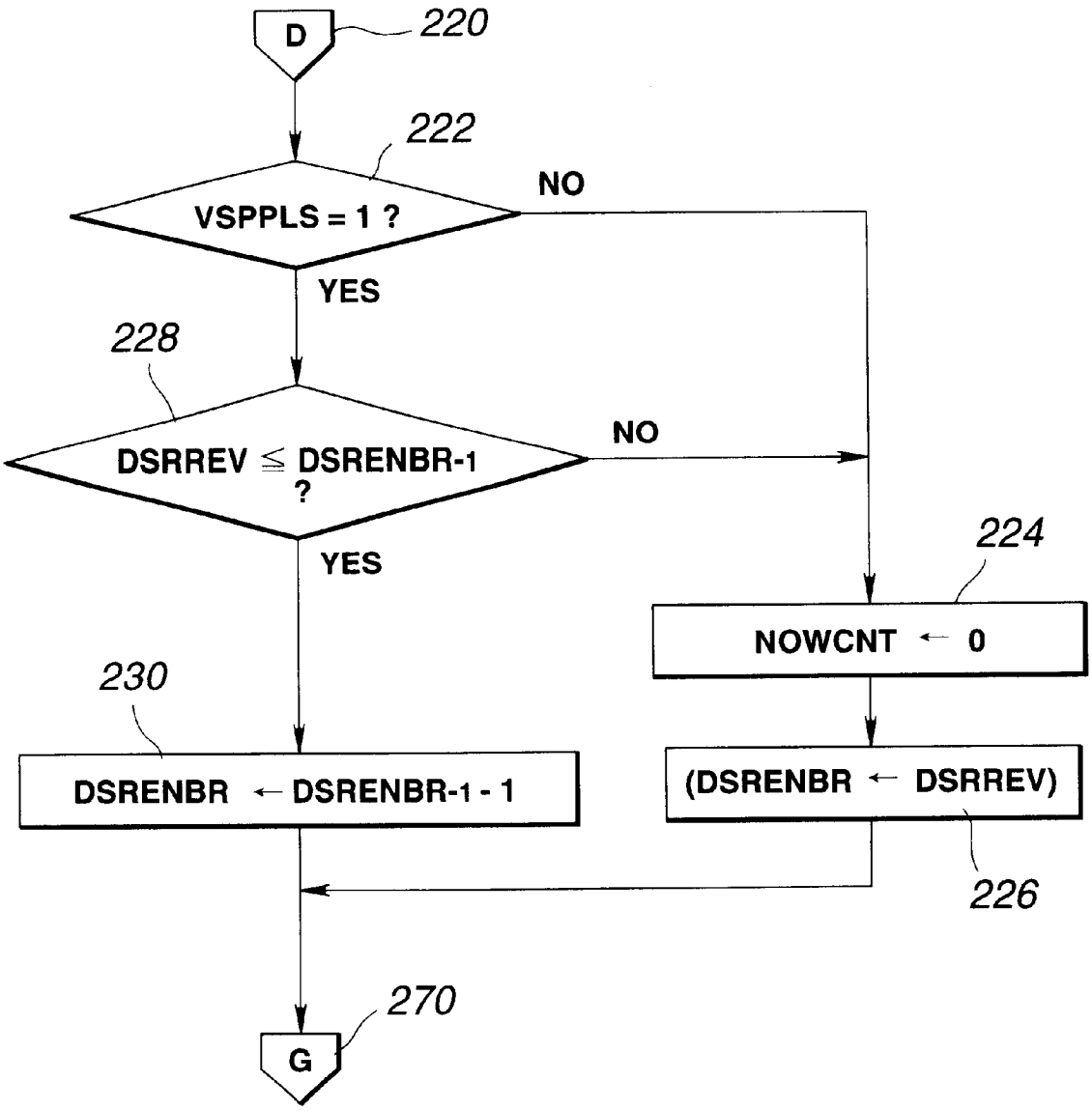

FIG. 8 is a flow diagram illustrating the correction of the target input shaft speed value DSRREV when the accelerator pedal is depressed or remains depressed. At the point 222 in the program, a determination is made as to whether or not the correction flag NOWCNT has been set at 1. If the answer to this question is "yes", then it means that the target input shaft speed value DSRREV is being corrected and the program proceeds to the point 228. Otherwise, the program proceeds to the point 224 where the correction flag NOWCNT is cleared to 0 and then to the point 226 where the target input shaft speed value DSRREV calculated at the point 106 of FIG. 2 is set for the corrected target input shaft speed value DSRENBR. Following this, the program proceeds to the point 270 of FIG. 10.

At the point 228 in the program, a determination is made as to whether or not the target input shaft speed value DSRREV calculated at the point 106 of FIG. 2 is equal to or less than the corrected target input shaft speed value DSRENBR$_{-1}$ obtained in the last cycle of execution of this program. If the answer to this question is "yes", then the program proceeds to the point 230. Otherwise, the program proceeds to the point 224. At the point 230, the corrected target input shaft speed value DSRENBR is calculated by subtracting a predetermined value (in the illustrated case 1 rmp) from the last corrected target input shaft speed value $DSRENBR_{-1}$ ($DSRENBR=DSRENBR_{-1}-1$). Following this, the program proceeds to the point 270 of FIG. 10.

Figure 9:
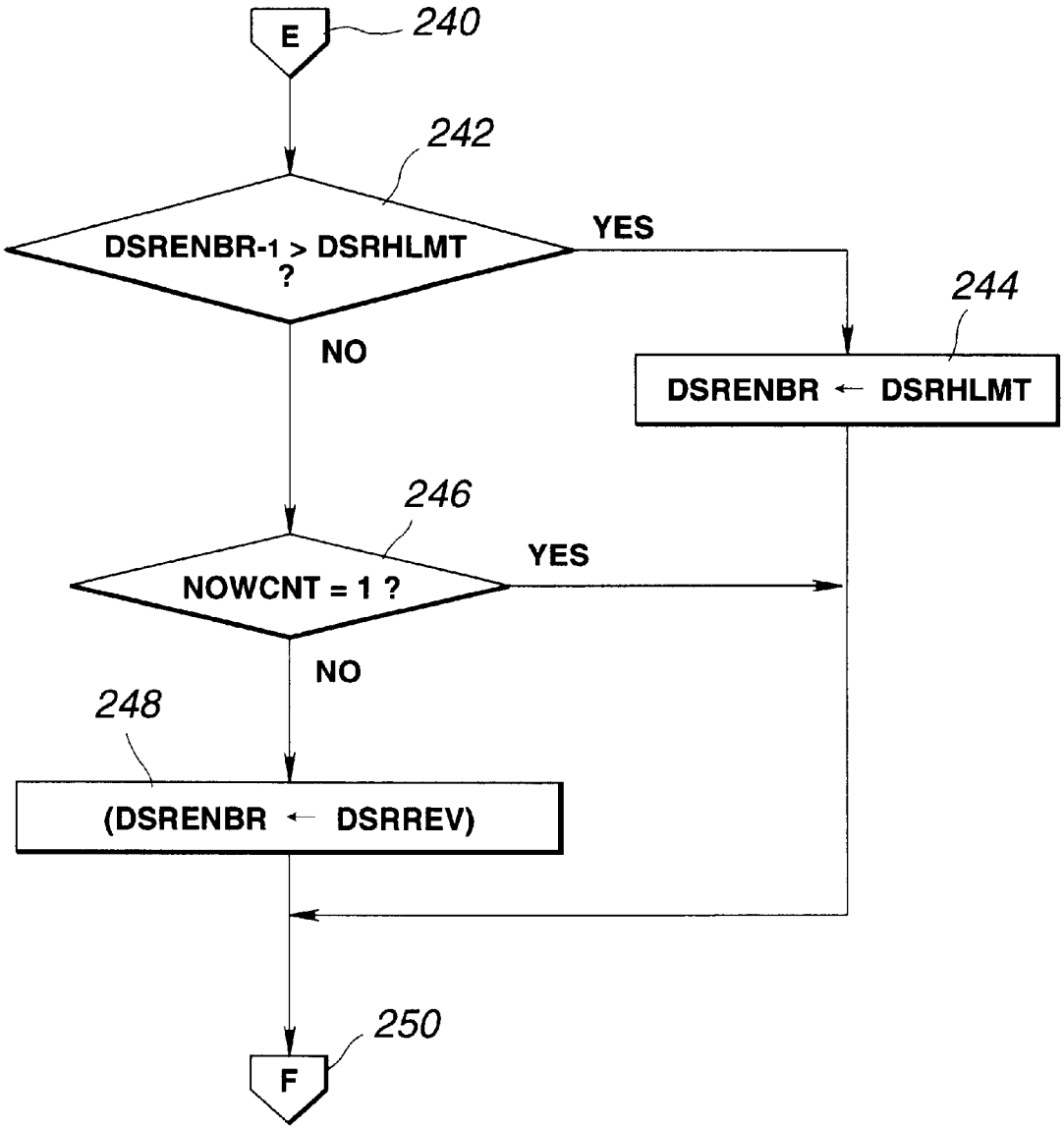

FIG. 9 is a flow diagram illustrating the correction of the target input shaft speed value DSRREV when the accelerator pedal is released. At the point 242 in the program, a determination is made as to whether or not the last corrected target input shaft speed value $DSRENBR_{1}$_is greater than the upper limit DSRHLMT for the input shaft speed calculated at the point 142 of FIG. 4. If the answer to this question is "yes", then the program proceeds to the point 244 where the upper limit DSRHLMT is set for the corrected target input shaft speed DSRENBR and then to the point 250 of FIG. 10. Otherwise, the program proceeds to another determination step at the point 246. This determination is as to whether or not the correction flag NOWCNT has been set at 1. If the answer to this question is "yes", then it means that the target input shaft speed value DSRREV is being corrected and the program proceeds to the point 250 of FIG. 10. Otherwise, the program proceeds to the point 228 where the target input shaft speed value DSRREV calculated at the point 106 of FIG. 2 is set for the corrected target input shaft speed value DSRENBR. Following this, the program proceeds to the point 250 of FIG. 10.

Figure 10:
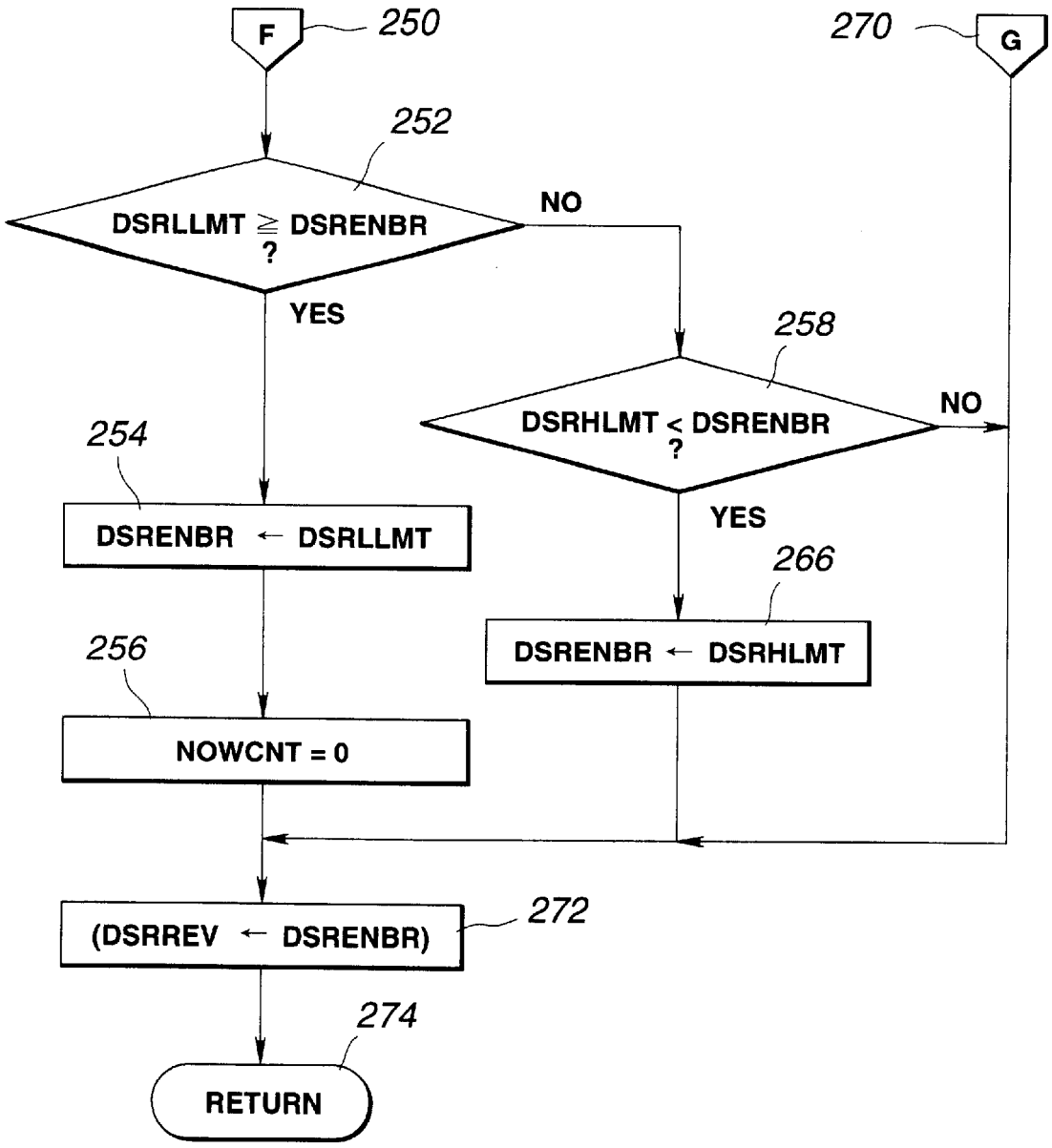

At the point 252 in the program of FIG. 10, a determination is made as to whether or not the corrected target input shaft speed value DSRENB is equal to or less than the lower limit DSRLLIT calculated at the point 144 of FIG. 4. If the answer to this question is "yes", then the program proceeds to the point 254 where the lower limit DSRLLMT is set for the corrected target input shaft speed value DSRENBR. At the point 256, the correction flag is cleared to zero. Following this, the program proceeds to the point 272.

If the answer to the question inputted at the point 254 is "no", then the program proceeds to another determination step at the point 258. This determination is as to whether or not the corrected target input shaft speed value DSRENBR is greater than the upper limit DSRHLMT calculated at the point 142 of FIG. 4. If the answer to this question is "yes", then the program proceeds to the point 266. Otherwise, the program proceeds to the point 272. At the point 266, the upper limit DSRHLMT is set for the corrected target input shaft speed value DSRENBR. Upon completion of the step at the point 266, the program proceeds to the point 272. The program proceeds from the point 270 to the point 272.

At the point 272, the corrected target input shaft speed value DSRENBR is set for the new target input shaft speed value DSRREV. Following this, the program proceeds to the point 274 where the program returns to the entry point 102 of FIG. 2. The calculated new target input shaft speed value DSRREV is transferred to the input/output interface unit which converts it into a corresponding target speed ratio and produces a control signal causing the speed ratio control unit 5 to set the continuously variable transmission 2 according to the target speed ratio. As a result, the vehicle acceleration is converged into the uniform motion range of FIG. 12, that is, the vehicle acceleration is controlled continuously to bring the engine brake force toward a value the operator expects according to the vehicle speed VSP.

Figure 14:
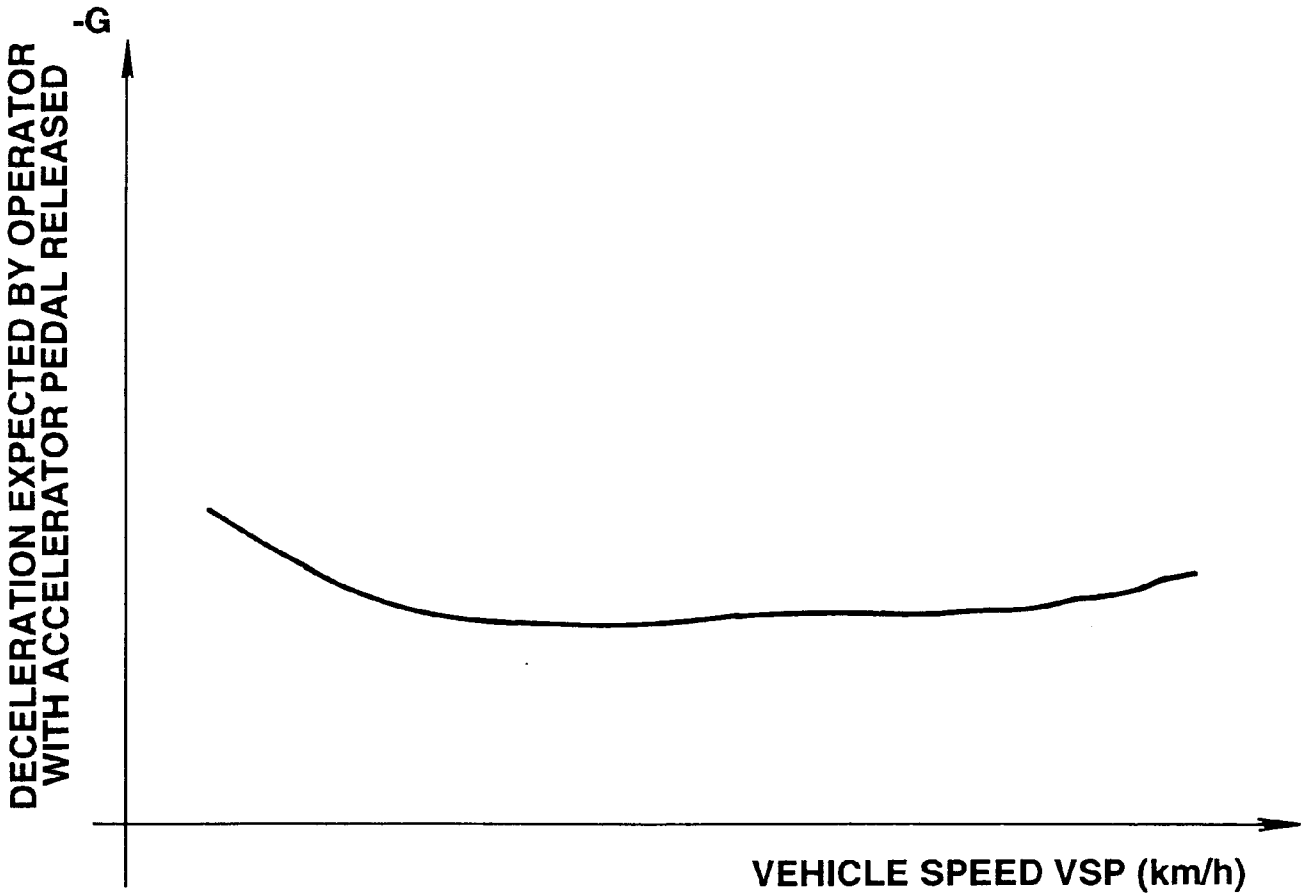
FIG. 14 is a graph of vehicle speed versus operator's expected deceleration.
Figure 15:
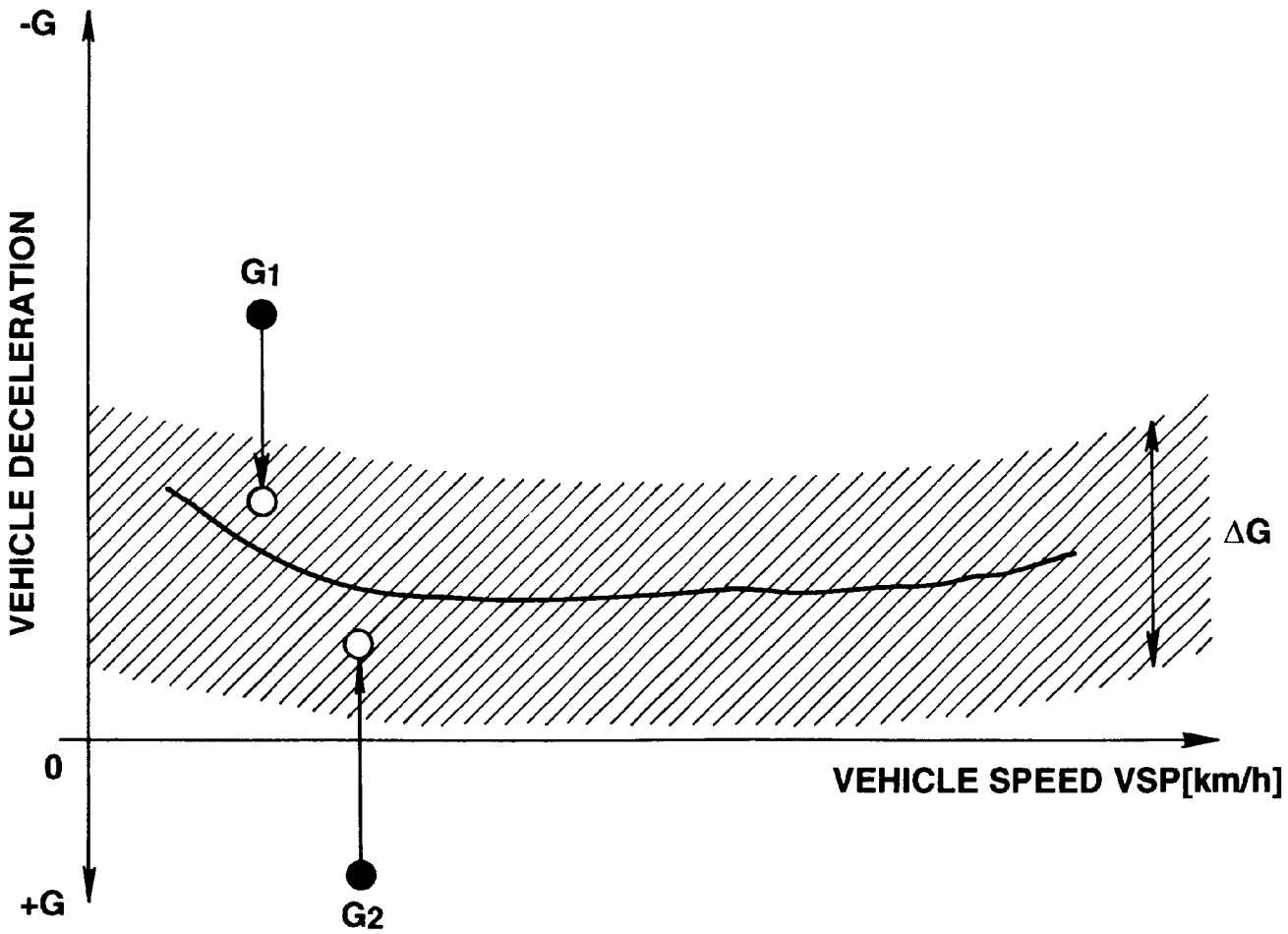
FIG. 15 is a graph of vehicle speed versus operator's expected deceleration used in explaining the target vehicle acceleration range.

The target input shaft speed value DSRREV is corrected at uniform time intervals based on a correction factor calculated from the map of FIG. 13 when the vehicle acceleration comes out of the uniform motion range of FIG. 12 with the vehicle being coasting, that is, with the accelerator pedal being released. The map of FIG. 12 is prepared through our experiments performed on a given automotive vehicle coasting down hills with the accelerator pedal being released. It has been discovered through the experiments that the degree of deceleration the operator expects when the accelerator pedal is released remains about 0.06 G (acceleration=−0.06 G) and it is almost independent on the vehicle speed VSP, as shown in FIG. 14. According to the invention, the target input shaft speed value is controlled to converge the deceleration resulting from the engine brake into a target acceleration range Δ G having a predetermined width around about −0.06 G, as indicated by the hatched area of FIG. 15, regardless of the vehicle speed VSP when the vehicle is coasting with the accelerator pedal released. If the vehicle acceleration is smaller than the target acceleration range Δ G as indicated by the point G2, the target input shaft speed value is corrected to decrease so as to weaken the engine brake force. If the vehicle acceleration is greater than the target accelerating range Δ G as indicated by the point G1, the target input shaft speed value is corrected to increase so as to provide a greater engine brake force.

Figure 16:
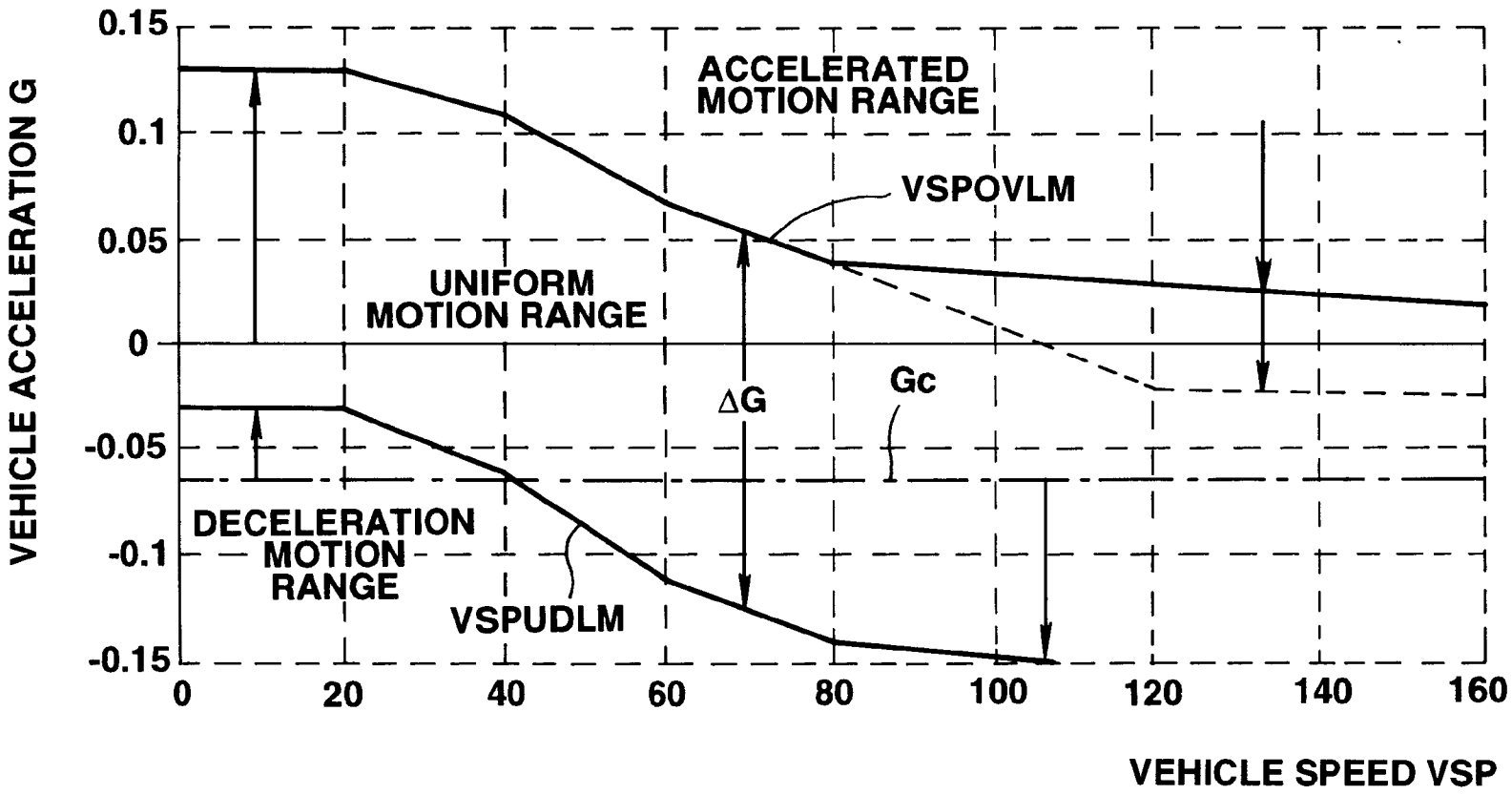
FIG. 16 is a graph of vehicle speed versus vehicle acceleration.
Figures 17A, 17B, 17C, 17D, 17E, 17F:
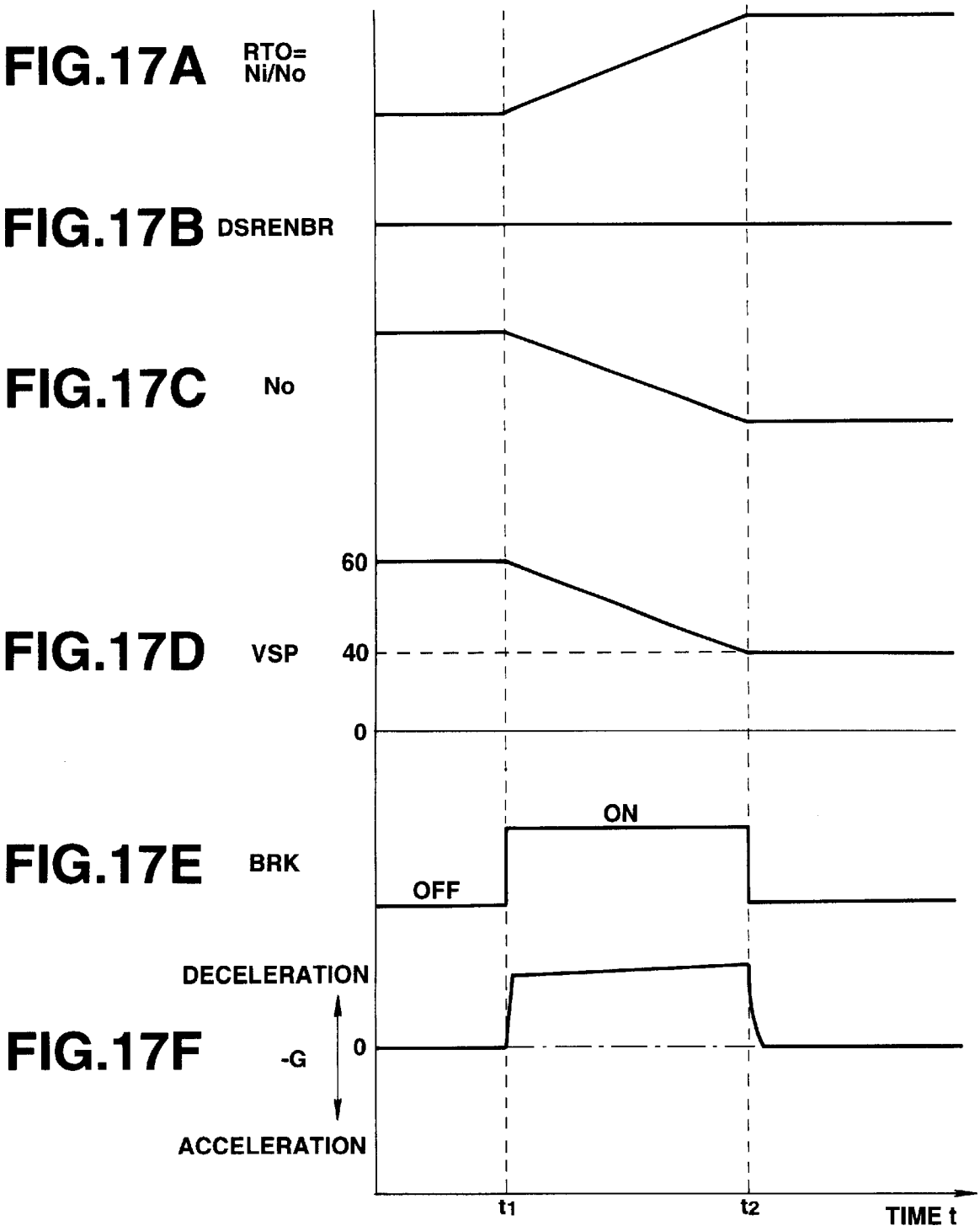
FIGS. 17A to 17F are graphs used in explaining the behaviors of the vehicle coasting on a downhill slope in connection with application of brake to the vehicle.

If the target acceleration range Δ G is set around about −0.06 G regardless of vehicle speed, however, the operator will bodily sense a stronger engine brake force at certain low vehicle speeds (about 20 km/h) and an insufficient engine brake force at certain high vehicle speeds (100 km/h or more). It has been discovered that the deceleration the operator expects when the accelerator pedal is released at such low or high vehicle speeds varies according to the vehicle speed VSP. For this reason, it is desirable to provide an engine brake force the operator expects when the accelerator pedal is released over the entire vehicle speed range by defining the uniform motion range corresponding to a predetermined acceleration range Δ G between upper and lower limits VSPOVLM and VSPUDLM which increase with respect to the reference acceleration value Gc (−0.06 G) as the vehicle speed VSP decreases and decreases with respect to the reference acceleration value Gc as the vehicle speed VSP increases, as shown in FIG. 16.

Description will be described further to the upper and lower limits VSPOVLM and VSPUDLM of the uniform motion range. The upper limit, that is, the acceleration side threshold value VSPOVLM of FIG. 12 used to determine whether the engine brake force is to be intensified, decreases as the vehicle speed VSP increases. This is effective to provide aggressive rapid engine brake application so as to meet the operator's expectation for a stronger deceleration when the accelerator pedal is released at a high vehicle speed. It is preferable to increase the engine brake force even with a small acceleration increase when the accelerator pedal is released at a very high vehicle speed by setting the the acceleration side threshold value VSPOVLM at a value equal substantially to zero or at a value less than zero when the vehicle speed VSP is in a very high range greater than a first predetermined value (for example, 100 km/h), as indicated by the broken lines of FIG. 16. When the vehicle speed VSP is in a very low vehicle speed range less than a predetermined second value (for example, 20 km/h), the operator expects almost no engine brake application even with the accelerator pedal being released. In such a very low vehicle speed range, the acceleration side threshold value VSPUDLM is set a value, for example 0.1 G or more, much greater than zero so as to avoid engine brake application even when the vehicle acceleration increases. In the range between the very-high and -low vehicle speed ranges, the acceleration side threshold value VSPOVIM is set to decrease as the vehicle speed VSP increases, as shown in FIGS. 12 and 16.

The upper limit, that is, the deceleration side threshold value VSPUDLM of FIG. 12 used to determine whether the engine brake force is to be weakened, decreases as the vehicle speed VSP increases. For example, the deceleration side threshold value VSPUDLM is set at a value greater than the reference value −0.06 G and smaller than zero in a low vehicle speed range. The deceleration side threshold value VSPUDLM is set at a value, for example, −0.1 G or less, smallr than the reference value −0.0 G in a high vehicle speed. Since the deceleration side threshold value VSPULM is sufficiently small when the vehicle is coasting at a high vehicle speed on a downhill slope with the accelerator pedal being released, the vehicle acceleration is held in the uniform motion range and the vehicle can coast to meet the operator's expectation without excessive target input shaft speed changes regardless of small slope gradient variations. When the vehicle speed VSP is in a very low vehicle speed range less than a predetermined second value (for example, 20 km/h), the operator expects almost no engine brake application even with the accelerator pedal being released. In such a very low vehicle speed range, thus, the acceleration side threshold value VSPUDLM is set at a value, for example, −0.03 G, somewhat smaller than zero so that the target input shaft speed value is corrected to decrease when the vehicle acceleration comes into the decelerated motion range. This is effective to avoid engine brake application so as to prevent the vehicle from being decelerated. Similarly, in the range between the high and low vehicle speed ranges, the deceleration side threshold value VSUD LM is set to decrease as the vehicle speed VSP increases, as shown in FIGS. 12 and 16.

The operation of the continuously variable transmission control apparatus of the invention will be described in connection with changes in the acceleration and deceleration side threshold values VSPOVLM and VSPUD LM defining the uniform motion range of FIG. 12. The acceleration TKRA MS 6 is monitored to determine whether the vehicle acceleration is in the uniform motion range of FIG. 12. This determination is made by comparison with the vehicle acceleration with the acceleration and deceleration side threshold values VSPOVLM and VSPUDLM (points 158 and 162). The vehicle acceleration is in the accelerated motion range if the vehicle acceleration is greater than the acceleration side threshold value VSPOVLM (point 160) and in the decelerated motion range if the vehicle acceleration is less than the acceleration side threshold value VSPUDLM (point 164). The operator's intention for vehicle deceleration is determined based on the operation of the accelerator pedal (points 174 to 182). When the vehicle is coasting with the accelerator pedal held released (point 200), the continuously variable transmission control apparatus increases the engine brake force by adding the downshift correction factor DDSRDN calculated from the map of FIG. 13 to the corrected target input shaft speed value DSRENB so as to correct the target input shaft speed in an increasing direction if the vehicle acceleration is in the accelerated motion range (points 202 and 204) and it weakens the engine brake force by adding the upshift correction factor DDSRUP to the corrected target input shaft speed value DSRENBR so as to correct the target input shaft speed value in a decreasing direction if the vehicle acceleration is in the decelerated motion range (points 212 and 214). That is, the continuously variable transmission control apparatus corrects the corrected target input shaft speed value DSRENBR to control the engine braking force so as to converge the vehicle acceleration into the uniform motion range of FIG. 12.

When the vehicle starts coasting with the accelerator pedal being released, the engine brake force the operator expects is dependent upon the vehicle speed VSP. If the continuously variable transmission 2 is controlled merely by bringing the input shaft speed into the target value DSRREV when the vehicle is coasting, a sudden and great engine brake force change will occur in response to a small slope gradient or road surface change. The invention permits a smooth and continuous engine brake change without such a sudden and great engine brake force change with the occurrence of a slope gradient or road surface change by controlling the engine brake force in a manner to bring the vehicle acceleration into the uniform motion range. The invention also can provide a smooth and continuous engine brake control in response to an engine load change.

Since the threshold values VSPOVLM and VSPUDLM used to determine the vehicle acceleration is in the uniform motion range of FIG. 12 is dependent on the vehicle speed VSP, the uniform motion range can be changed according to the status of the road on which the vehicle is operating, i.e., whether the road is a highway or superhighway or whether the road is less or much congested with traffic. It is, therefore, possible to provide a vehicle deceleration feel the operator expects without any sense of incompatibility.

The operation of the continuously variable transmission control apparatus of the invention will be described in connection with operator's brake pedal operation. The engine brake force correction starts upon the occurrence of two conditions, that is, when the vehicle acceleration TKRAMS6 comes out of the uniform motion range into the accelerated or decelerated motion range of FIG. 12 (points 158 and 162) and when the accelerator pedal remains released (points 200 et seq.). It is now assumed that the vehicle is coasting on a downhill slope with the accelerator pedal remaining released. When the vehicle acceleration comes into the accelerated or decelerated motion range of FIG. 12, determined based on the vehicle speed VSP, (points 160 and 164), the down- or up-shift correction factor DDSRDN or DSRUP is used to change the corrected target input shaft speed value DSRENBR and, thus, the engine brake force continuously at uniform time intervals. This is effective to provide smooth engine brake force changes in a direction to converge the vehicle acceleration into the uniform motion range of FIG. 12 according to the gradient of the downhill slope so as to realize a feel of vehicle deceleration the operator expects.

When the gradient of the downhill slope on which the vehicle is coasting with the accelerator held released increases, the vehicle acceleration increases into the accelerated motion range (FIG. 12) so as to increase the vehicle speed VSP since the target input shaft speed value has been set for a more gentle gradient of the downhill slope. For this reason, it is required to intensify the engine brake force. According to the invention, a downshift correction factor DDSRDN is calculated, from the map of FIG. 13, as a function of vehicle acceleration when the vehicle acceleration comes into the accelerated motion range (FIG. 12). The downshift correction factor DDSRDN is added to the last value of the corrected target input shaft speed value DSRENBR to change the target speed ratio value DSRRTO. The downshift correction factor DDSP, DN is calculated, at uniform intervals of time (in the illustrated case 5 msec) according to the existing vehicle acceleration. This is effective to provide smooth target input shaft speed value changes and thus smooth engine brake force changes in a direction to converge the vehicle acceleration into the uniform motion range (FIG. 12) according to the increase of the gradient of the downhill slope so as to realize a feel of vehicle deceleration the operator expects.

When the gradient of the downhill slope on which the vehicle is coasting with the accelerator held released decreases, the vehicle acceleration decreases into the decelerated motion range (FIG. 12) so as to decrease the vehicle speed VSP since the target input shaft speed value has been set for a more steep gradient of the downhill slope. For this reason, it is required to weaken the engine brake force. According to the invention, an upshift correction factor DDSRUP is calculated, from the map of FIG. 13, as a function of vehicle acceleration when the vehicle acceleration comes into the decelerated motion range (FIG. 12). The upshift correction factor DDSRDN (which has a negative value) is added to the last value of the corrected target input shaft speed value DSRENBR to change the target speed ratio value DSRRTO. The upshift correction factor DDSRUP is calculated, at uniform intervals of time (in the illustrated case 5 msec) according to the existing vehicle acceleration. This is effective to provide smooth target input shaft speed value changes and thus smooth engine brake force changes in a direction to converge the vehicle acceleration into the uniform motion range (FIG. 12) according to the decrease of the gradient of the downhill slope so as to realize a feel of vehicle deceleration the operator expects.

It is now assumed that the brake pedal is depressed to initiate braking at time t1, for decreasing the vehicle speed to 40 km/h or less, when the vehicle coasting at 60 km/h on a downhill slope comes close to the front vehicle running at 40 km/h. Since the vehicle is coasting on a downhill slope in this case, the engine brake force correction (points 200 et seq.) continues (NOWCNT=1 at the point 208). Because of braking, however, the vehicle deceleration increases so that the vehicle acceleration comes into the decelerated motion range (FIG. 12). As a result, the deceleration flag VSPMNS is set at 1 and then the control is performed to weaken the engine brake force from the point 212. Since the brake flag BRK is set at 1 to indicate the brake pedal is depressed, the corrected input shaft speed DSRENBR remains at the last value therefor.

During the interval between the times t1 at which the brake pedal is depressed and the time t2 at which the brake pedal is released, the vehicle speed VSP decreases causing a decrease in the speed No of rotate on of the output shaft of the transmission 2. On the other hand, the corrected target input shaft speed value DSRENBR (=target input shaft speed DSRREV) remains at the value calculated at the time t1 when braking is initiated. For this reason, the speed ratio DSRRTO increases to intensify the engine brake force continuously so as to permit raid vehicle deceleration.

After the time t2, the engine brake force control proceeds from the point 200 to retain the target input shaft speed value at the value calculated at the time t2 at which the brake pedal is released. It is, therefore, possible to prevent the vehicle from being accelerated to come close to the front vehicle again. This is effective to avoid frequent operator's brake pedal operations.

The operation of the continuously variable transmission control apparatus of the invention will be described in connection with operator's accelerator pedal operation. The engine brake force correction starts upon the occurrence of two conditions, that is, when the vehicle acceleration TKRAMS6 comes out of the uniform motion range into the accelerated or decelerated motion range of FIG. 12 (points 158 and 1 62) and when the accelerator pedal remains released (points 200 et seq.). It is now assumed that the vehicle is coasting on a downhill slope with the accelerator pedal remaining released. When the vehicle acceleration comes into the accelerated or decelerated motion range of FIG. 12, determined based on the vehicle speed VSP, (points 160 and 164), the down- or up-shift correction factor DDSRDN or DSRUP is used to control the rate at which the corrected target input shaft speed value DSRENBR is changed. This is effective to provide smooth engine brake force changes in a direction to converge the vehicle acceleration into the uniform motion range of FIG. 12 so as to realize a feel of vehicle deceleration the operator expects.

Figure 18A:
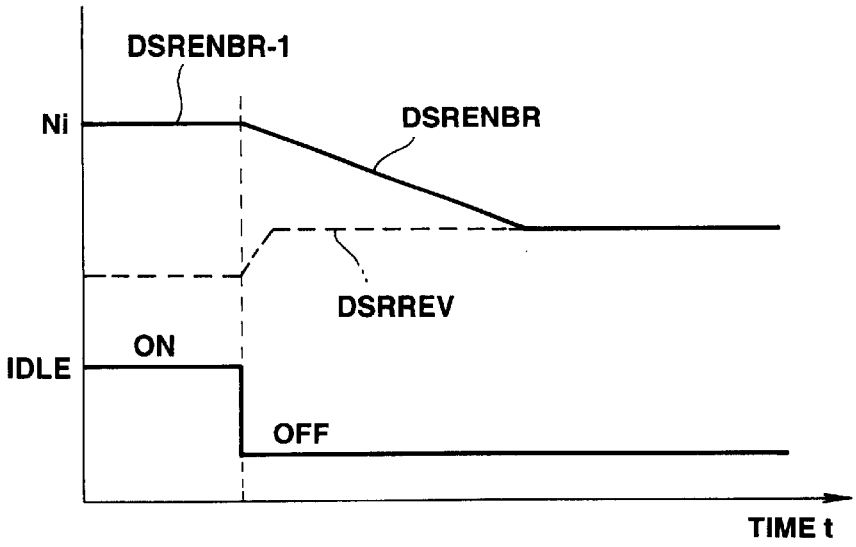
FIG. 18A is a graph showing corrected target input shaft speed value changes with time when changes up are required to resume the normal control without target input shaft speed value correction.
Figure 18B:
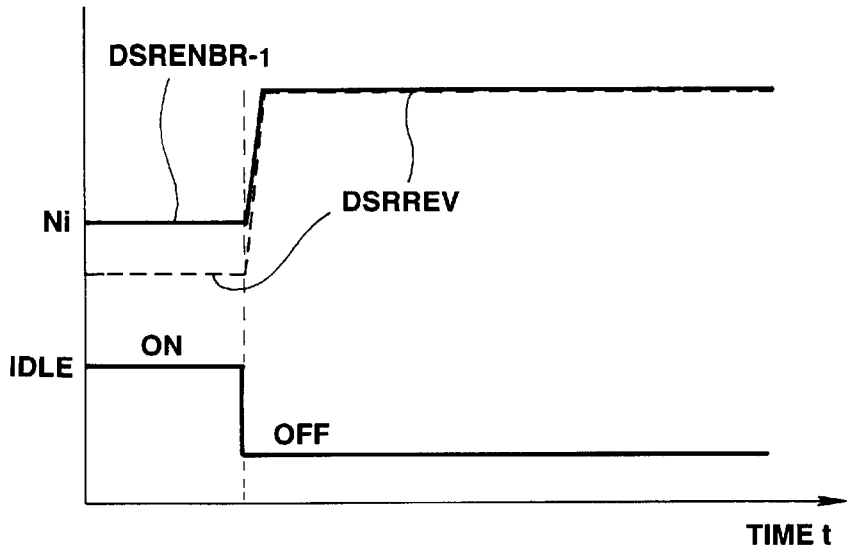
FIG. 18B is a graph showing corrected target input shaft speed value changes with time when changes down are required to resume the normal control without target input shaft speed value correction.

When the operator depresses the accelerator pedal during the vehicle coasting, the control proceeds to the points 220 et seq. so as to terminate the engine brake force correction. In this case, if the target input shaft speed value DSRREV calculated from the map of FIG. 11 is equal to or greater than the last value $DSRENBR_{-1}$ of the corrected target input shaft speed (point 228), it means that changes up are required to initiate the normal speed change control without the engine brake force correction and the target input shaft speed is increased gradually from the last corrected target input shaft speed value $DSRENBR_{-1}$ to the calculated target input shaft speed value DSRREV, as shown in FIG. 18A, by decreasing a predetermined value (for example, 1 rpm) from the last value $DSRENBR_{-1}$ of the corrected target input shaft speed (point 230) so as to avoid shocks resulting from great vehicle acceleration changes. On the other hand, if the target input shaft speed value DSRREV calculated from the map of FIG. 11 is less than the last value $DSRENBR_{-1}$ of the corrected target input shaft speed (point 228), it means that changes down are required to initiate the normal speed change control without the engine brake force correction and the target input shaft speed is set at the value calculated from the map of FIG. 11.

Preferably, the corrected target input shaft speed value DSRENBR is changed at a predetermined constant value (in the illustrated case 1 rpm) at uniform intervals of time (in the illustrated case 5 msec corresponding to each cycle of execution of the program). This permits the operator to easily grasp the vehicle behavior changes resulting from accelerator pedal operation regardless of changes in vehicle operating conditions such as downhill slope gradient. While the start of vehicle coasting is judged when the accelerator pedal is released, it is to be understood that the engine brake force correction may be initiated upon the operation of the deceleration command switch associated with a cruise control unit or in response to a deceleration command produced from the cruise control unit. While the termination of the engine brake force correction is judged when the accelerator pedal is depressed, it is to be understood that the engine brake force correction may be terminated upon the operation of the acceleration command switch associated with a cruise control unit or in response to an acceleration command produced from the cruise control unit.

What is claimed is:

1. An apparatus for controlling a continuously variable transmission for use with an automotive vehicle including an accelerator pedal, the transmission having an input and output shaft, the transmission being operable at a variable speed ratio for transmitting a drive from the input shaft to the output shaft, comprising:

means for sensing vehicle operating conditions including vehicle acceleration and vehicle speed;

means for producing a released accelerator pedal indicative signal when the accelerator pedal is released;

means for calculating a target value for the speed of rotation of the input shaft based on the sensed vehicle operating conditions;

means for calculating a correction factor per predetermined unit time based on the sensed vehicle acceleration when the sensed vehicle acceleration exceeds a threshold value in the presence of the released accelerator pedal indicative signal;

means for adding the correction factor to the target input shaft speed value to correct the target input shaft speed value in an increasing direction at intervals of the predetermined unit time;

means for decreasing the threshold value as the vehicle speed increases; and means for controlling the speed ratio to bring the input shaft speed into coincidence with the corrected target value.

2. A continuously variable transmission control apparatus as claimed in claim 1, further including means for setting the threshold value at a predetermined value greater than zero when the vehicle speed is equal to or higher than a first predetermined value and a predetermined value less than zero when the vehicle speed is equal to or higher than a second predetermined value, reducing the correction factor substantially to zero when the vehicle acceleration is equal to or less than a predetermined value less than the first predetermined value.

3. An apparatus for controlling a continuously variable transmission for use with an automotive vehicle including an accelerator pedal, the transmission having an input and output shaft, the transmission being operable at a variable speed ratio for transmitting a drive from the input shaft to the output shaft, comprising:

means for sensing vehicle operating conditions including vehicle acceleration and vehicle speed;

means for producing a released accelerator pedal indicative signal when the accelerator pedal is released;

means for calculating a target value for the speed of rotation of the input shaft based on the sensed vehicle operating conditions;

means for calculating a correction factor per predetermined unit time based on the sensed vehicle acceleration when the sensed vehicle acceleration is less than a threshold value in the presence of the released accelerator pedal indicative signal;

means for subtracting the correction factor from the target input shaft speed value to correct the target input shaft speed value in a decreasing direction at intervals of the predetermined unit time;

means for decreasing the threshold value as the vehicle speed increases; and means for controlling the speed ratio to bring the input shaft speed into coincidence with the corrected, target value.

4. A continuously variable transmission control apparatus as claimed in claim 3, further including means for setting the threshold value at a predetermined value less than zero and close to zero when the vehicle speed is equal to or lower than a predetermined value.

5. An apparatus for controlling a continuously variable transmission for use with an automotive vehicle including an accelerator pedal, the transmission having an input and output shaft, the transmission being operable at a variable speed ratio for transmitting a drive from the input shaft to the output shaft, comprising:

means for sensing vehicle operating conditions including vehicle acceleration;

means for producing a released accelerator pedal indicative signal when the accelerator pedal is released;

means for producing a brake application indicative signal in response to application of braking to the vehicle;

means for calculating a target value for the speed of rotation of the input shaft based on the sensed vehicle operating conditions;

means for calculating a correction factor per predetermined unit time based on the sensed vehicle acceleration to bring the vehicle acceleration into a predetermined range in the presence of the released accelerator pedal indicative signal;

means for adding the correction factor to the target input shaft speed value to correct the target input shaft speed value at intervals of the predetermined unit time;

means for controlling the speed ratio to bring the input shaft speed into coincidence with the corrected target value; and means for retaining the correction factor in the presence of the brake application indicative signal.

6. An apparatus for controlling a continuously variable transmission for use with an automotive vehicle including an accelerator pedal, the transmission having an input and output shaft, the transmission being operable at a variable speed ratio for transmitting a drive from the input shaft to the output shaft, comprising:

means for sensing vehicle operating conditions including vehicle acceleration;

means for sensing an operator's demand for vehicle cruising;

means for sensing an operator's demand for vehicle acceleration;

means for calculating a target value for the speed of rotation of the input shaft based on the sensed vehicle operating conditions;

means responsive to the sensed operator's demand for vehicle cruising for correcting the calculated target input shaft speed value to bring the vehicle acceleration into a predetermined range;

means responsive to the operator's demand for vehicle acceleration sensed during the target input shaft speed value correction for changing the target input shaft speed value at a predetermined rate toward the calculated target value; and means for controlling the speed ratio to bring the input shaft speed into coincidence with the corrected target value.

7. A continuously variable transmission control apparatus as claimed in claim 6, wherein the means for correcting the calculated target input shaft speed value includes means for subtracting a predetermined value from the corrected target value at uniform time intervals when the corrected target value is equal to or greater than the calculated target value.

8. An apparatus for controlling a continuously variable transmission for use with an automotive vehicle including an accelerator pedal, the transmission having an input and output shaft, the transmission being operable at a variable speed ratio for transmitting a drive from the input shaft to the output shaft, comprising:

means for sensing vehicle operating conditions including vehicle acceleration;

means for sensing a degree to which the accelerator pedal is depressed;

means for calculating a target value for the speed of rotation of the input shaft based on the sensed vehicle operating conditions;

means for correcting the calculated target input shaft speed value to bring the vehicle acceleration into a predetermined range when the sensed degree indicates the accelerator pedal released;

means for changing the target input shaft speed value at a predetermined rate toward the calculated target value when the sensed degree indicate the accelerator pedal depressed during the target input shaft speed value correction; and means for controlling the speed ratio to bring the input shaft speed into coincidence with the corrected target value.

9. A continuously variable transmission control apparatus as claimed in claim 8, wherein the means for correcting the calculated target input shaft speed value includes means for subtracting a predetermined value from the corrected target value at uniform time intervals when the corrected target value is equal to or greater than the calculated target value.

*10. An apparatus for controlling a continuously variable transmission for use with an automotive vehicle including an accelerator pedal, the transmission having an input shaft and an output shaft, the transmission being operable at a variable speed ratio for transmitting a drive from the input shaft to the output shaft, comprising:*

*means for sensing vehicle operating conditions including vehicle speed;*

*means for calculating a target value for the speed of rotation of the input shaft based on the sensed vehicle operating conditions;*

*means for producing a released accelerator pedal indicative signal when the accelerator pedal is released;*

*means for determining a vehicle acceleration;*

*means for calculating a correction factor per predetermined unit time based on the determined vehicle acceleration when the determined vehicle acceleration exceeds a threshold value in the presence of the released accelerator pedal indicative signal;*

*means for adding the correction factor to the target input shaft speed value to correct the target input shaft speed value in an increasing direction at intervals of the predetermined unit time;*

*means for decreasing the threshold value as the vehicle speed increases; and*

*means for controlling the speed ratio to bring the input shaft speed into coincidence with the corrected target value.*

*11. A continuously variable transmission control apparatus as claimed in claim 10, further including means for setting the threshold value at a predetermined value greater than zero when the vehicle speed is equal to or higher than a first predetermined value and a predetermined value less than zero when the vehicle speed is equal to or higher than a second predetermined value, reducing the correction factor substantially to zero when the vehicle acceleration is equal to or less than a predetermined value less than the first predetermined value.*

*12. An apparatus for controlling a continuously variable transmission for use with an automotive vehicle including an accelerator pedal, the transmission having an input shaft and an output shaft, the transmission being operable at a variable speed ratio for transmitting a drive from the input shaft to the output shaft, comprising:*

*means for sensing vehicle operating conditions including vehicle speed;*

*means for calculating a target value for the speed of rotation of the input shaft based on the sensed vehicle operating conditions;*

*means for producing a released accelerator pedal indicative signal when the accelerator pedal is released;*

*means for determining a vehicle acceleration;*

*means for calculating a correction factor per predetermined unit time based on the determined vehicle acceleration when the determined vehicle acceleration is less than a threshold value in the presence of the released accelerator pedal indicative signal;*

*means for subtracting the correction factor from the target input shaft speed value to correct the target input shaft speed value in a decreasing direction at intervals of the predetermined time unit;*

*means for decreasing the threshold value as the vehicle speed increases; and*

*means for controlling the speed ratio to bring the input shaft speed into coincidence with the corrected target value.*

*13. A continuously variable transmission control apparatus as claimed in claim 12, further including means for setting the threshold value at a predetermined value less than zero and close to zero when the vehicle speed is equal to or lower than a predetermined value.*

*14. An apparatus for controlling a continuously variable transmission for use with an automotive vehicle including an accelerator pedal, the transmission having an input shaft and an output shaft, the transmission being operable at a variable speed ratio for transmitting a drive from the input shaft to the output shaft, comprising:*

*means for sensing vehicle operating conditions including vehicle speed;*

*means for calculating a target value for the speed of rotation of the input shaft based on the sensed vehicle operating conditions;*

*means for producing a released accelerator pedal indicative signal when the accelerator pedal is released;*

*means for producing a brake application indicative signal in response to application of braking to the vehicle;*

*means for determining a vehicle acceleration;*

*means for calculating a correction factor per predetermined unit time based on the determined vehicle acceleration to bring the vehicle acceleration into a predetermined range in the presence of the released accelerator pedal indicative signal;*

*means for adding the correction factor to the target input shaft speed value to correct the target input shaft speed value at intervals of the predetermined unit time;*

*means for controlling the speed ratio to bring the input shaft speed into coincidence with the corrected target value; and*

*means for retaining the correction factor in the presence of the brake application indicative signal.*

*15. An apparatus for controlling a continuously variable transmission for use with an automotive vehicle including an accelerator pedal, the transmission having an input shaft and an output shaft, the transmission being operable at a variable speed ratio for transmitting a drive from the input shaft to the output shaft, comprising:*

*means for sensing vehicle operating conditions including vehicle speed;*

*means for sensing an operator's demand for vehicle cruising;*

*means for calculating a target value for the speed of rotation of the input shaft based on the sensed vehicle operating conditions;*

*means for sensing an operator's demand for vehicle acceleration;*

*means for determining a vehicle acceleration;*

*means responsive to the sensed operator's demand for vehicle cruising for correcting the calculated target input shaft speed value to bring the vehicle acceleration into a predetermined range;*

*means responsive to the operator's demand for vehicle acceleration sensed during the target input shaft speed value correction for changing the target input shaft speed value at a predetermined rate toward the calculated target value; and*

*means for controlling the speed ratio to bring the input shaft speed into coincidence with the corrected target value.*

*16. A continuously variable transmission control apparatus as claimed in claim 15, wherein the means for correcting the calculated target input shaft speed value includes means for subtracting a predetermined value from the corrected target value at uniform time intervals when the corrected target value is equal to or greater than the calculated target value.*

*17. An apparatus for controlling a continuously variable transmission for use with an automotive vehicle including an accelerator pedal, the transmission having an input shaft and an output shaft, the transmission being operable at a variable speed ratio for transmitting a drive from the input shaft to the output shaft, said apparatus comprising:*

*means for sensing vehicle operating conditions including vehicle speed;*

*means for calculating a target value for the speed of rotation of the input shaft based on the sensed vehicle operating conditions;*

*means for sensing a degree to which the accelerator pedal is depressed;*

*means for determining a vehicle acceleration;*

*means for correcting the calculated target input shaft speed value to bring the vehicle acceleration into a predetermined range when the sensed degree indicates the accelerator pedal released;*

*means for changing the target input shaft speed value at a predetermined rate toward the calculated target value when the sensed degree indicate the accelerator pedal depressed during the target input shaft speed value correction; and*

*means for controlling the speed ratio to bring the input shaft speed into coincidence with the corrected target value.*

*18. A continuously variable transmission control apparatus as claimed in claim 17, wherein the means for correcting the calculated target input shaft speed value includes means for subtracting a predetermined value from the corrected target value at uniform time intervals when the corrected target value is equal to or greater than the calculated target value.*

* * * * *